United States Patent
Desai et al.

(10) Patent No.: US 12,192,053 B2
(45) Date of Patent: Jan. 7, 2025

(54) INTERRUPT COGNIZANT RF TUNING

(71) Applicant: Cisco Technology, Inc., San Jose, CA (US)

(72) Inventors: Vishal S Desai, San Jose, CA (US); Young Il Choi, San Jose, CA (US); Abhishek Datta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/307,777

(22) Filed: Apr. 26, 2023

(65) Prior Publication Data

US 2024/0364589 A1   Oct. 31, 2024

(51) Int. Cl.
*H04L 41/082* (2022.01)
*H04L 41/0823* (2022.01)
*H04L 41/149* (2022.01)

(52) U.S. Cl.
CPC ........ *H04L 41/082* (2013.01); *H04L 41/0836* (2013.01); *H04L 41/149* (2022.05)

(58) Field of Classification Search
None
See application file for complete search history.

(56) References Cited

U.S. PATENT DOCUMENTS

| | | |
|---|---|---|
| 8,073,455 B1 | 12/2011 | Xie et al. |
| 2012/0127871 A1 | 5/2012 | Puthenpura et al. |
| 2014/0244721 A1* | 8/2014 | Taine ............... H04L 67/02 709/203 |
| 2015/0178070 A1* | 6/2015 | Doi ............... G06F 8/65 717/172 |
| 2020/0028738 A1 | 1/2020 | Killadi et al. |
| 2020/0304523 A1 | 9/2020 | Yadav et al. |
| 2020/0396131 A1 | 12/2020 | Gagula |
| 2021/0282024 A1* | 9/2021 | Moreman ............ H04W 64/00 |
| 2023/0137891 A1* | 5/2023 | Babaei ............... H04L 43/08 455/436 |
| 2024/0015686 A1* | 1/2024 | Rao ............... H04W 64/00 |

* cited by examiner

*Primary Examiner* — Fadi Haj Said
(74) *Attorney, Agent, or Firm* — Polsinelli P.C.

(57) ABSTRACT

The disclosed technology relates to determining a period in which a non-urgent RRM update should be deferred. The method may comprise applying a first update to an existing configuration of the plurality of wireless access points in the network based on an analysis of telemetry received from the plurality of wireless access points received over a period spanning at least two busy periods. The method may further comprise applying a second update that modifies the first preferred network configuration based on an analysis of telemetry received during the first busy period. The method may further comprise applying a maintenance update to the tweaked network configuration based on telemetry received during the next busy period.

20 Claims, 11 Drawing Sheets

US 12,192,053 B2

INTERRUPT COGNIZANT RF TUNING

BACKGROUND

Wireless systems employ processes to manage the radio resources of the wireless devices to optimize parameters including channelization, transmit power, etc. The management of the radio helps avoid or mitigate issues with signal interference, bandwidth contention, etc. Newer Wi-Fi standards allow for more bandwidth capacity for Wireless Local Area Network (WLAN). With wide channel bandwidths, e.g., up to 160 MHz, and very high data rates, higher throughput through the WLAN can be attained. However, usage of wide bandwidths contributes to high frequency reuse, which can cause more interference on at least some channels, among Basic Service Sets (BSSs) in a Radio Frequency (RF) neighborhood. Thus, The Access Points (APs) providing wireless access to the WLAN must carefully administer Radio Resource Management (RRM) to balance the higher bandwidth capacity and the increased interference potential (caused by overlapping spectrum) when selecting the higher bandwidths.

Performance of RRM updates often cause disruption in the network and client disconnects. The current method for optimizing network configurations for wireless AP to provide better connectivity to wireless clients does not consider periods of high activity and connectivity for the network. Thus, RRM updates can result in periods of decreased performance. Reconfigurations are typically performed based on performance triggers or intervals and do not maintain a historical perspective of the network. Periods of high network traffic and low network traffic might be identified, but may be inputted manually or dictated by network settings and are not dynamic in nature.

Generating an appropriate RRM update involves collecting samples from the network (usually for a specified duration of time) and configuring the network according to those samples. Traditionally, RRM leverages radio metrics and performs channel, power, bandwidth, radio role, and other RF optimizations immediately to reduce contention and increase network capacity. This method aims towards improving client experience, the resulting configuration updates on the radios would drive client disconnects and roaming failures that would be counterproductive. Often, tuning involves channel power bandwidth changes that can disrupt client connection temporarily. Providers and/or controllers are then forced to decide whether RF updates and sample-gathering should be done during hours of low network connectivity, like at night, to avoid client disconnects and disruption of service, or during hours of high network connectivity, where the samples gathered are a more accurate demonstration of the network telemetry. If a network sought to sample the network during peak hours and complete the updates during non-peak hours using the traditional approach of immediate RF configuration updates after sampling, the sample size and duration would need to be large. A large sample results in a higher amount of computation required for normalizing and leveraging the data. This technique is not energy cognizant and results in an unnecessarily high amount of computation power.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
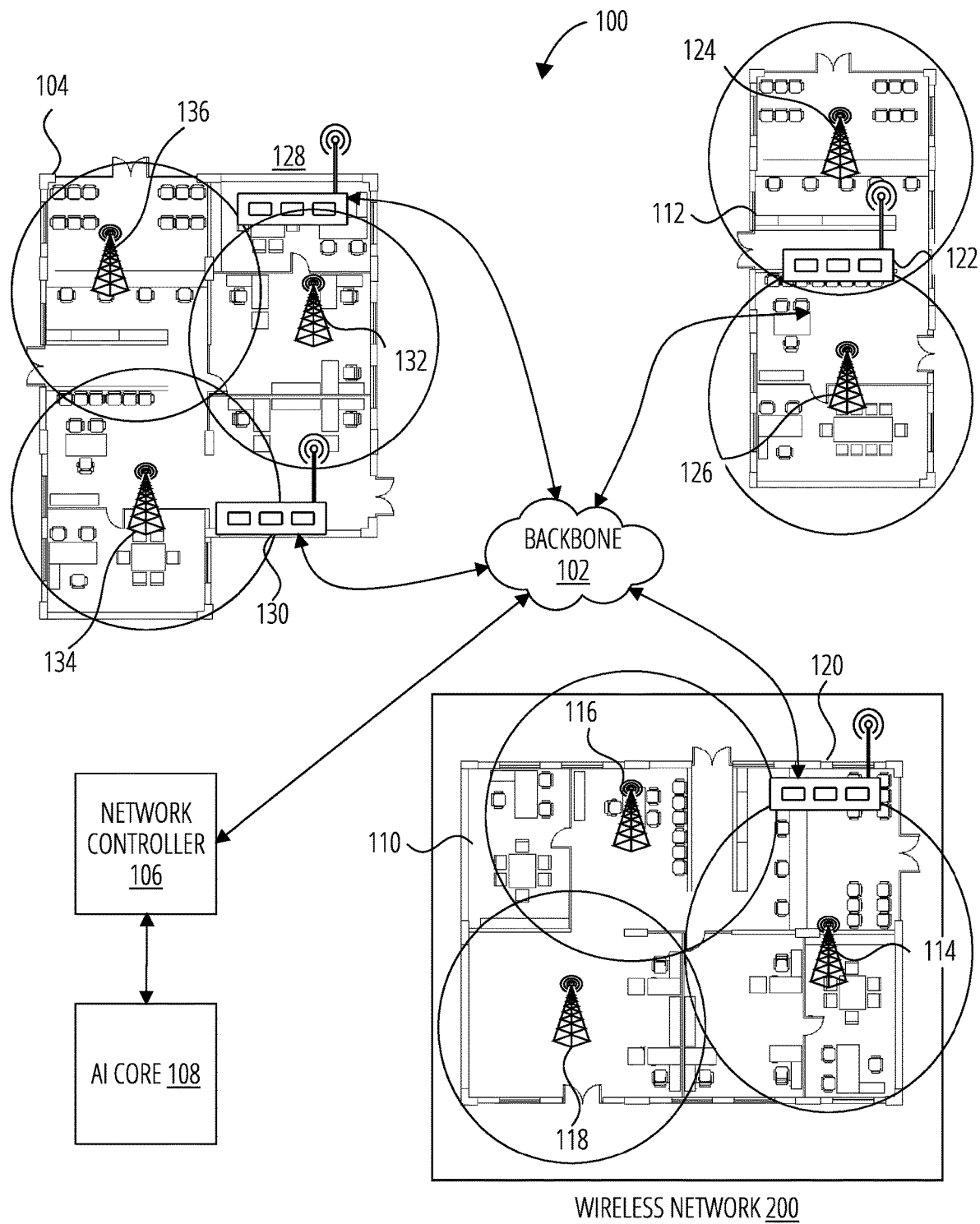
FIG. 1 illustrates an example of an AI-RRM system network according to some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present description pertains to technologies for determining a period in which a network is busier relative to other periods. For example, the present description describes a method of the present technology. The method can receive first telemetry from a plurality of wireless access points in a network during a first period, analyze the first telemetry, and determine that at least one access point could support an improved connection to at least one user device being serviced by the plurality of access points in the network through a first potential configuration change. Additionally, the method can determine to disregard the first potential configuration change based on the network being in a first busy period, and that the first potential configuration change is not significant enough to warrant making the change during the first busy period, wherein the first period occurs during the first busy period.

Additionally, the network may be a first network neighborhood of an enterprise network. Additionally, the analysis of the telemetry and the determination to disregard the potential configuration change can be performed by a local RRM controller. The method may also further comprise determining to apply the first potential configuration change when the first potential configuration change is significant enough to warrant making the change during the first busy period.

The method may further comprise receiving second telemetry from the plurality of wireless access points reported during a second period, the second period including data from several busy periods including the first busy period. The method may further comprise analyzing the second telemetry, determining first preferred network configurations for the plurality of wireless access points in the network based on the second telemetry, and applying the first preferred network configurations to the plurality of wireless access points in the network during a third period. Additionally, the third period may be during a non-busy period and the third period occurs near the start of the non-busy period.

The method may further comprise receiving third telemetry from the plurality of wireless access points reported during the first busy period and the third telemetry includes the first telemetry. The method may further comprise analyzing the third telemetry, determining modifications to the first preferred network configurations for the plurality of wireless access points in the network based on the analysis of the third telemetry, and applying the modification to the first preferred network configurations to the plurality of wireless access points in the network during a fourth period. Additionally, the fourth period may be during the non-busy period, the fourth period occurs after the third period, and the fourth period occurs at least a determined amount prior to a start of a next busy period.

Additionally, the method may further comprise applying a first update to an existing configuration of the plurality of wireless access points in the network based on an analysis of telemetry received from the plurality of wireless access points received over a period spanning at least two busy periods. The update can be applied a short period after termination of the first busy period and during a non-busy period and the first update to the existing configuration puts the plurality of wireless access points in the network to a first preferred network configuration, whereby the network is configured for general operation.

The method may further comprise applying a second update that modifies the first preferred network configuration based on an analysis of telemetry received during the first busy period, wherein the second update is applied during the non-busy period after the first update, whereby the network configuration is tweaked to prepare for a next busy period based on telemetry from the first busy period, resulting in a tweaked network configuration. The method may further comprise applying a maintenance update to the tweaked network configuration based on telemetry received during the next busy period and the maintenance update is applied during the next busy period when the maintenance update is significant enough to warrant making the change during the next busy period.

A non-transitory computer-readable medium described herein may store instructions which, when executed by one or more processors, cause the one or more processors to perform any of the methods as previously described.

Systems are described herein for determining a period in which a network is busier relative to other periods. The systems include one or more processors and a non-transitory computer-readable storage medium storing instructions that, when executed by the one or more processors, cause the one or more processors to perform any of the methods as previously described.

These illustrative examples are mentioned not to limit or define the disclosure, but to aid understanding thereof. Additional embodiments are discussed in the Example Embodiments, and further description is provided there.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As discussed herein, radio resource management (RRM) pertains to monitoring one or more KPIs for a particular access point (AP), group of APs, or a network having access points, and adjusting the configuration of APs in the network to improve the performance of one or more APs in the network. For example, this might occur when an AP is reporting loss of data or weak signal strength resulting from interference by a neighboring AP. RRM can reconfigure the AP to change RF channels or to configure multiple APs to reduce their transmit power so that they are not interfering with their neighbors. Typically, RRM updates are made when poor KPIs are observed.

However, RRM configurations and updates often cause disruption in the network and result in instances of clients losing their connection to wireless APs in the network. The current methods for optimizing network configurations for wireless APs to provide better connectivity to wireless clients does not consider the utilization of the network in deciding whether to apply an RRM update. Thus, RRM configuration changes can result in periods of decreased performance before they improve performance. Reconfigurations are typically performed based on performance triggers or intervals and do not maintain a historical perspective of the network. Periods of high network traffic and low network traffic might be identified, but may be inputted manually or dictated by network settings and are not dynamic in nature.

The disclosed technology addresses the need in the art for a mechanism for determining a network's operational patterns. Traditionally, periods of high connectivity and network usage (i.e., "busy periods") were considered stagnant and constant. Busy periods were configured by network defaults or administrator settings. Predetermination of busy periods does not account for dynamic variables within the network, such as changing workflow and seasonality. Additionally, if some calculations are performed by an administrator or the network alike to determine busy periods for the network, many services do not consider outliers and other variables in the data that could generate inaccurate results (e.g., pseudo-steady clients, client storms, seasonality, etc.).

When a network is able to successfully determine busy periods for the network, then during periods of peak usage and client connectivity, non-urgent RRM configurations and updates may be deferred to non-busy periods. This prevents clients disconnects and improves network performance.

FIG. 1 illustrates an example of an AI-RRM system network according to aspects of the present disclosure. The AI-RRM system network includes three buildings (i.e., building A 104, building B 110, and building C 112). In this nonlimiting example, the building A 104 includes two wireless LAN controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B 1124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a CAPWAP tunnel. Building A 104, building B 110, and building C 112 may be network segments (i.e., smaller portions of the larger network system, wherein the smaller portions may have qualities and/or configurations that differ from one another, like busy periods). Building A 104, building B 110, and building C 112 may be configured into additional network segments (e.g., by floor or hallway).

The settings of the WLCs can be controlled by a network controller 106, which communicates with the WLCs via the backbone 102. For example, the network controller 106 can be a CISCO DNA center, which is a centralized intent-based network management system. The network controller 106 can be based in the cloud, for example. Further, an artificial intelligence (AI) core 108 communicates a signal to and from the network controller 106. The AI Core 108 can communicate a recommendation, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The AI Core 108 may be, for example, a cloud-based application that learns from the wireless network 200 and from additional wireless networks how best to optimize the network configurations based on data and measured values from the respective networks. The configuration recommendations are then sent from the AI Core 108 to the network controller 106.

Figure 2:
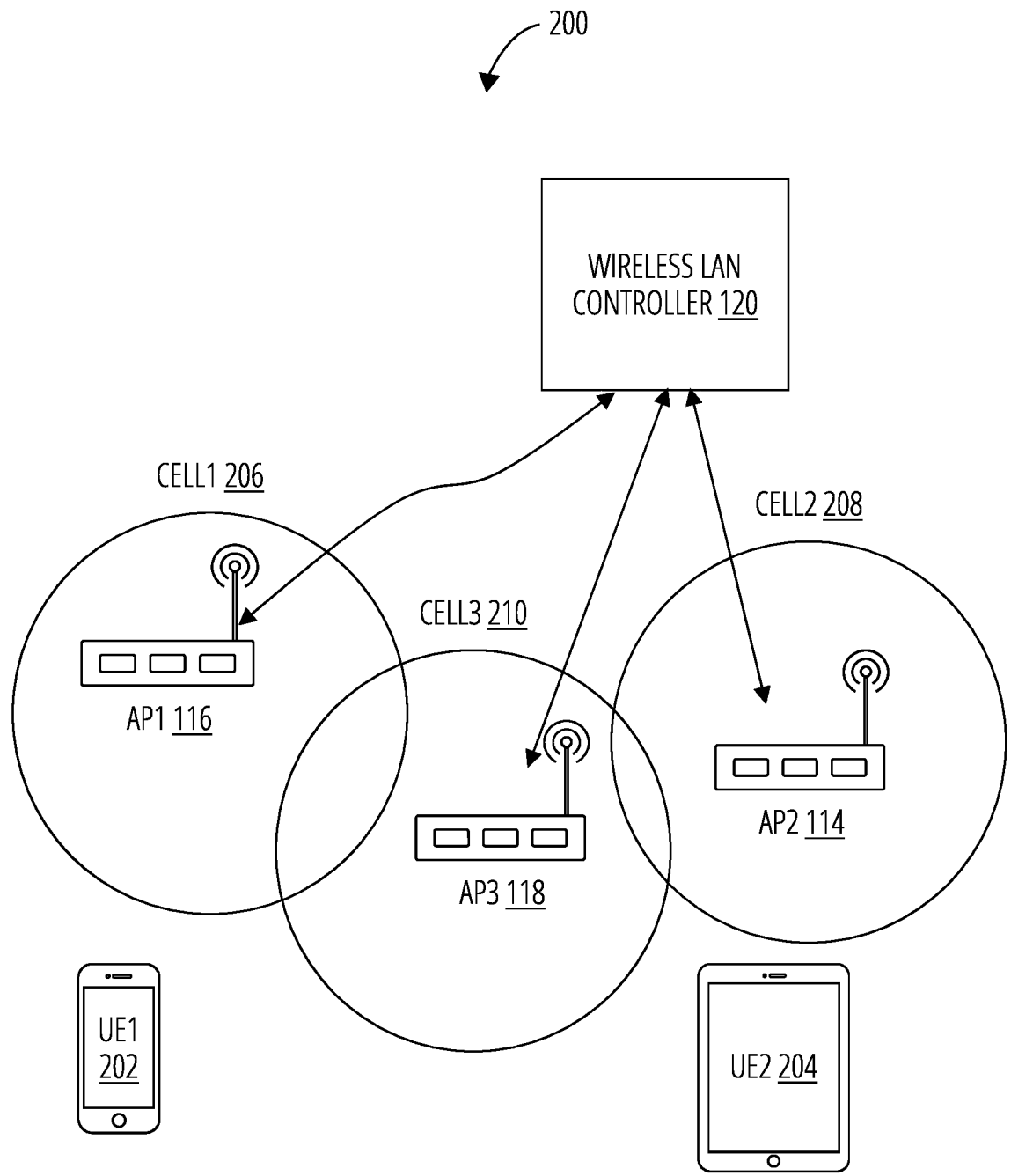
FIG. 2 illustrates an example embodiment of a wireless network within the AI-RRM system network according to some aspects of the present technology.

FIG. 2 illustrates an example embodiment of a wireless network within the AI-RRM system network according to aspects of the present disclosure. The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 114 and user equipment 2 (UE2) 204, can wirelessly communicate with the respective AP of the cell (e.g., cell1 206 surrounds AP1 116; cell2 208 surrounds AP2 114; cell3 210 surrounds AP3 118). As the user device moves from one cell to the next, the cell the user device is communicating with will change. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations, which of the configuration recommendations to apply at which times, and to which parts of the wireless network 200. Then, the configuration recommendations can be implemented by the network controller 106 in accordance with the specifications by the network administrator (or other uses).

The wireless LAN controller 120 can communicate with a wide area network (WAN) 206 to allow the user devices to access the internet, for example. The wireless network 200 can be a WiFi network operating in accordance with an IEEE 802.11 protocol.

The AI Core 108 can be used to perform radio resource management (RRM). RRM allows the wireless network 200 to continuously analyze the existing RF environment, and based on this analysis, automatically adjust each APs' power and channel configurations to help mitigate such things as co-channel interference and signal coverage problems. RRM can reduce the need to perform exhaustive site surveys, and RRM can increase system capacity and provides automated self-healing functionality to compensate for RF dead zones and AP failures. RRM includes several algorithms, which together provide management of the wireless network 200.

Figure 3:
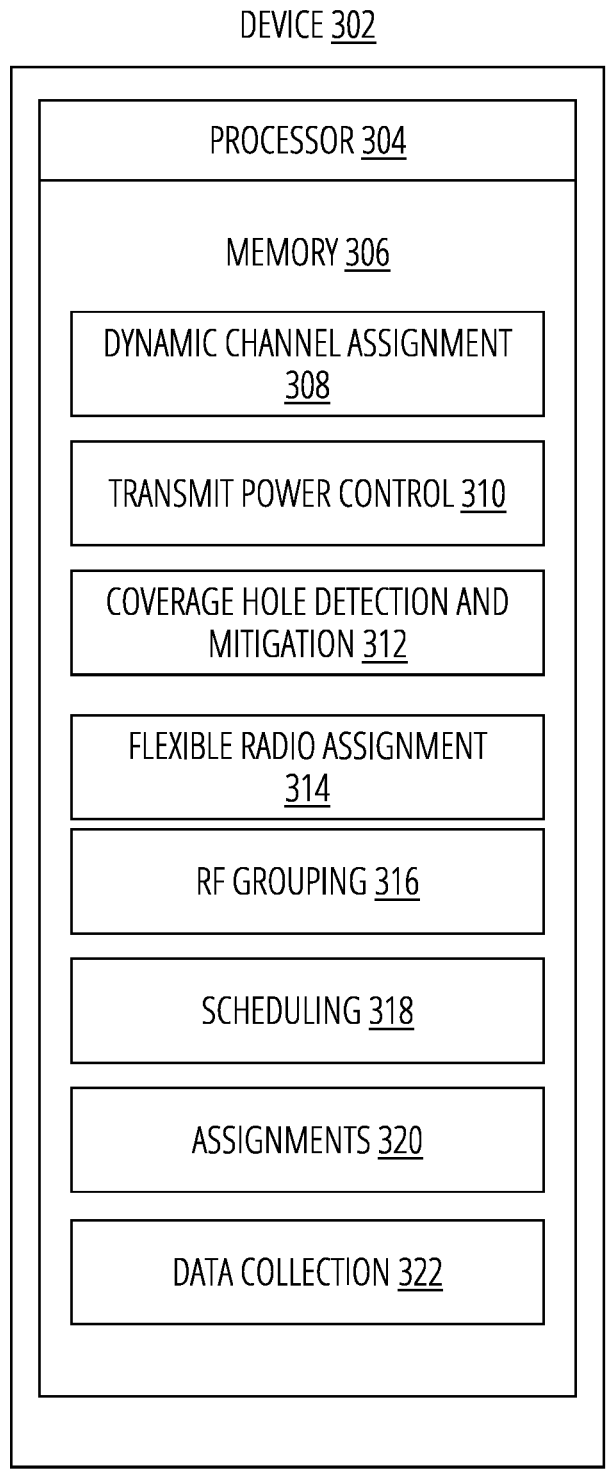
FIG. 3 illustrates a computing device that performs various RRM functions according to some aspects of the present technology.

FIG. 3 illustrates a computing device 302 that performs various RRM steps/methods according to aspects of the present disclosure. Device 302 can be a performed using distributed computing. Some or all of the functions of device 302 can be performed by the WLCs, and some or all may be performed by the network controller 106 and/or the AI Core 108. In some embodiments, the device 302 can be an embodiment of the AI Core 108, illustrated in FIG. 2. In some embodiments, the functions attributed to device 302 might reside across the AI Core 108, network controller 106, and other devices illustrated in wireless network 200. The device 302 includes a processor 204 that performs the steps of the respective methods when executing the respective methods stored in the memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) Dynamic Channel Assignment (DCA) 308 (e.g., a global algorithm that runs on the RF Group leader); (iv) Transmit Power Control (TPC) 210 (e.g., a global algorithm that runs on the RF Group Leader; and (v) Coverage Hole Detection and Mitigation (CHDM) 212 (e.g., a local algorithm that runs on each individual controller). The respective methods help to maintain optimal performance by optimally applying resources to balance various countervailing interest.

For example, increasing the transmit power in a cell (e.g., cell1 206 of an AP1 116) might help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of available spectrum, the management traffic also increases, which also takes up a part of the channel capacity. The result is higher consumption of airtime and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages, including several features which manage specific traffic types or client types which can greatly increase the spectral efficiency and assist RRM in providing a better experience for users. The RRM can be organized according to a hierarchy with an RF Group Name at the top level, then RF Group Leader(s) at the next level, which are then followed by RF Neighborhood(s) at the lower level. For any RF Group Name, multiple RF Group Leaders may exist (e.g., one or more RF Group Leaders frequencies in the 2.4 GHz band and one or more RF Group Leaders frequencies in the 5 GHz band). An RF Group Leader can manage multiple RF Neighborhoods.

As used herein, the term "signal" refers to RF emanating from AP's belonging to the same RF group or our AP's. The term "interference" refers to signals (e.g., Wi-Fi signals) that interfere with a desired signal, such as signals that belong to other networks (rogues). The term "noise" refers to any signal that cannot be demodulated according to the protocol of the wireless network 200 (e.g., any signal that is not an 802.11 signal). For example, noise can be from a non-802.11 source (such as a microwave or Bluetooth device) or from an 802.11 source, whose signal is below sensitivity threshold of the receiver or has been corrupted due to collision or interference. The term "dBm" refers to an absolute, logarithmic, mathematical representation of the strength of an RF signal (e.g., dBm directly correlates to milliwatts, but may also be used to represent output powers in the very low values common in wireless networking). The term "RSSI" or "Received Signal Strength Indicator" refers to an absolute, numeric measurement of the strength of the signal in a channel. The term "Noise floor" refers to the ambient RF Noise level (e.g., an absolute value expressed in dBm) below which received signals are unintelligible. The term "SNR" refers to a ratio of signal strength to noise floor, which is a relative value, and as such, is measured in decibels (dB).

The term "RF Group" refers to the logical container that an instance of RRM is configured through. All devices belonging to a single RF Network will be configured as a member of a particular RF group. The term "RF Group Leader" refers to the device where the algorithms for the RF group will be run. The RF Group Leader is either automatically selected through an election process or may be manually assigned through configuration. The term "RF Neighborhood" refers to a group of APs that belong to the same RF group. For example, the RF Neighborhood can be a group of APs that can hear each other at ≥−80 dBm. This is a physical grouping based on RF proximity. The term "TPC" or "Transmit Power Control" refers to the RRM algorithm that monitors and manages transmit power level for all APs in the RF group. The term "DCA" or "Dynamic Channel Assignment" refers to the RRM algorithm responsible for selecting the operating channel for all APs in the RF group. The term "CHDM" or "Coverage Hole Detection and Mitigation" refers to the Coverage Hole Detection (CHD) algorithm and the Coverage Hole Mitigation (CHM) algorithm. The term "CM" or "Cost Metric" refers to an RSSI based metric which combines AP load, co-channel interference, adjacent channel interference, and non-WiFi sourced interference into a goodness metric, which can be used by the DCA method 308 to evaluate effective channel throughput potential. The term "COF" or "Coverage Overlap Factor" refers to an output of FRA algorithm. For example, the COF can represent a percentage of cells covered to −67 dBm by other 2.4 GHz radios. The term "FRA" or "Flexible Radio Assignment" refers to an RRM algorithm that manages flexible radios and determines coverage redundancy and best roles for Flexible Radios to play based on coverage requirements and density.

The RF grouping 316 method is used as the basis for the administrative management domain and the physical management domain within the RF Network. Regarding the administrative domain, proper function of the RRM is based on knowing which APs and controllers are under administrative control for each part of the network. For example, the RF Group name can be an ASCII string that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (i.e., a group of APs that belong to the same RF Group that can physically hear one another's neighbor messages above −80 dBm, for example). Each RF Group has at least one RF Group Leader per band. The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel every 60 seconds or less. The NDP packet is a special broadcast message that APs all listen for and it allows us to understand how every radio on every channel hears every other radio. It also gives us the actual RF path loss between APs. When an AP hears an NDP message, the AP validates whether the message is from a member of its RF Group. If the NDP message is valid. The AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post processing of this information can be used to generate measurements for RX Neighbors (e.g., how the given AP hears other APs) and TX Neighbors (e.g., how other APs hear the given AP).

Regarding the flexible radio assignment 314 method, the FRA uses the outputs from the Neighbor Discovery Protocol to locate each radio in RF distance and evaluate overlapping coverage by cell. Now, the flexible radio assignment 314 method is described according to certain non-limiting examples. First, using the NDP measurements from the AP's, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding, FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 314 keeps track of radios that are coverage contributors to other radios COF, and the FRA method 314 prevents those radios to be marked redundant as long as a radio they are a contributor for is marked redundant.

Once a Radio is marked redundant, the next step depends on the radio configuration. For example, there can be two (or more) operational states to which the flexible radio can be assigned: (i) FRA-auto or (ii) manual. When the radios in the "FRA Auto" state, FRA looks to DCA to decide what to do with the now redundant radio(s). DCA's priorities are, first, to try to assign the redundant radio in 5 GHz and increase capacity, but, if the DCA determines that there is already maximum 5 GHz coverage, the radio will be assigned to a monitor role instead.

Regarding the dynamic channel assignments 308 method, the DCA monitors the available channels for the RF group and tracks the changing conditions. The DCA then optimize the RF separation between AP's (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other AP's/clients on the same channel—also known as Co-Channel interference or CCI); (ii) foreign channel—rogue (e.g., other non RF Group AP's operating on or overlapping with the AP's served channel); (iii) noise (e.g., sources of interference such as Bluetooth, analog video, or cordless phones); (iv) channel load (e.g., through the use of industry standard QBSS measurements—these metrics are gathered from the Phy layer—very similar to CAC load measurements); and (v) DCA sensitivity (e.g., a sensitivity threshold selectable by the user that applies hysteresis to the evaluation on channel changes). The impact of each of these factors can be combined to form a single RSSI based metric known as the Cost Metric (CM). The CM then represents complex signal to noise and interference ration (SNIR) of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand-in-hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organizes lists built on how reception strength (Rx) from other APs (RX Neighbor) and transmit strength (Tx) to other APs (TX Neighbor), to form a picture of the communication strength among the respective APs within the RF Neighborhood and RF Group. Based on this information, TPC sets the transmit power of each AP to maximize the coverage and minimize co-channel interference. TPC will adjust the Tx power up or down to meet the required coverage level indicated by the TPC Threshold. TPC runs on the RF Group Leader and is a global algorithm that can be sub-configured in RF profiles for groups of APs in an AP group.

Regarding the coverage hole detection and mitigation 312 ("CHDM") method, the method can be used to achieve the following objectives: (i) detecting coverage holes, (ii) validating the coverage holes, and (iii) mitigating the coverage holes. That is, CHDM first detects coverage holes and then mitigates them (if possible, without creating other problems) by increasing the transmit power, and therefore, cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring on all associated Aps, and thus monitoring every attached client and their received signal levels. Mitigation involves increasing the power on an AP, or group of APs, to improve coverage levels in a certain area where client signals fall below a customer-selectable threshold.

According to certain non-limiting examples, coverage hole detection can be based on a 5 second (CHD measurement period) histogram of each client's received RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process preformed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for, will re-qualify and power will again be increased by 1 step. This incremental approach can prevent wild and unstable swings in power.

Coverage hole mitigation, while operating independent of RRM's DCA and TPC, can have a significant effect on surrounding APs and the balance of the RF in an environment. Part of the decision to mitigate is based on an evaluation of whether the mitigation could be successful. Increasing the power of a given AP independent of the RF Group metrics is likely to negatively impacting surrounding APs. So, mitigation can be applied judiciously. The combination of the new detection metrics and the power limits included in mitigation are applied to make CHDM a stable algorithm.

In addition to the above methods, the memory 306 of the device 302 can also store information for scheduling 318, assignments 320, and information for data collection 322. The data collection 322 can include several types of measurements.

With respect to data collection 322, the RRM processes collect data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally, or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can be used to detect rogues and collect noise and interference metrics. Also, a Neighbor Discovery Protocol Transmission (TX) can be used to send the NDP message from all channels defined to be part of a monitor set.

Figure 4A:
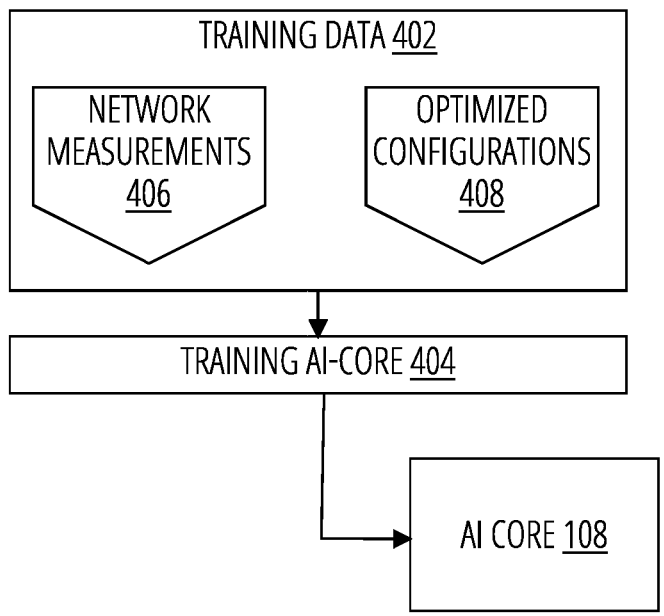
FIG. 4A illustrates an example of training an artificial intelligence model according to some aspects of the present technology.

FIG. 4A illustrates an example of training an artificial intelligence model (i.e., AI Core 108) according to aspects of the present disclosure. In block 404, training data 402 is applied to training the AI Core 108. For example, the AI Core 108 can be an artificial neural network (ANN) that is trained via supervised learning using a backpropagation technique to train the weighting parameters between nodes within respective layers of the ANN. In supervised learning, a set of training data 402 is obtained, and the network is iteratively updated to reduce an error/loss function. The value of the error/loss function decreases as the AI Core 108 outputs configurations that increasingly approximate the optimized configurations 408. In other words, ANN infers the mapping implied by the training data, and the error/loss function produces an error value related to the mismatch between the optimized configurations 408 and the output from the AI Core 108 that is produced by applying the network measurements 406 to the AI Core 108. For example, in certain implementations, the cost function can use the mean-squared error to minimize the average squared error. In the case of a of multilayer perceptron (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribidre update, Powell-Beale restart, and scaled conjugate gradient). Additionally, evolutionary methods, such as gene expression programming, simulated annealing, expectation-maximization, non-parametric methods, and particle swarm optimization can also be used for training the AI Core 108.

The training 404 of the AI Core 108 can also include various techniques to prevent overfitting to the training data 402 and for validating the trained AI Core 108. For example, boot strapping and random sampling of the training data 402 can be used during training.

In addition to supervised learning used to initially train the AI Core 108, the AI Core 108 can be continuously trained while being used by using reinforcement learning based on the network measurements and the corresponding configurations used on the network. The AI Core 108 can be cloud based and can be trained using network measurements and the corresponding configurations from other networks that provide feedback to the cloud.

Further, other machine learning (ML) algorithms can be used for the AI Core 108, and the AI Core 108 is not limited to being an ANN. For example, there are many machine-learning models, and the AI Core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include, but are not limited to, a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
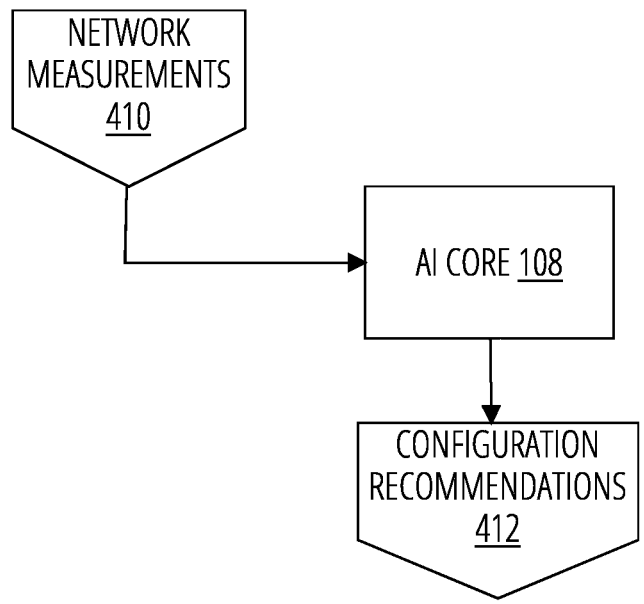
FIG. 4B illustrates an example of using the trained artificial intelligence model according to some aspects of the present technology.

FIG. 4B illustrates an example of using the trained artificial intelligence model according to aspects of the present disclosure (e.g., AI Core 108). The actual network measurements are applied to the trained AI Core 108, which then generates configuration recommendations 412. The configuration recommendations will then be provided to a network controller 106, which selectively applies the configuration recommendations in accordance with settings therein. For example, the configuration recommendations can be applied a predefined times for certain portions of the wireless network 200. For example, certain configuration recommendations might only be applied when there is a radio reset. Other configuration recommendations might be applied only when there is minimal risk of disrupting service during business hours. Further, different regions within the wireless network 200 might be scheduled differently.

Figure 5:
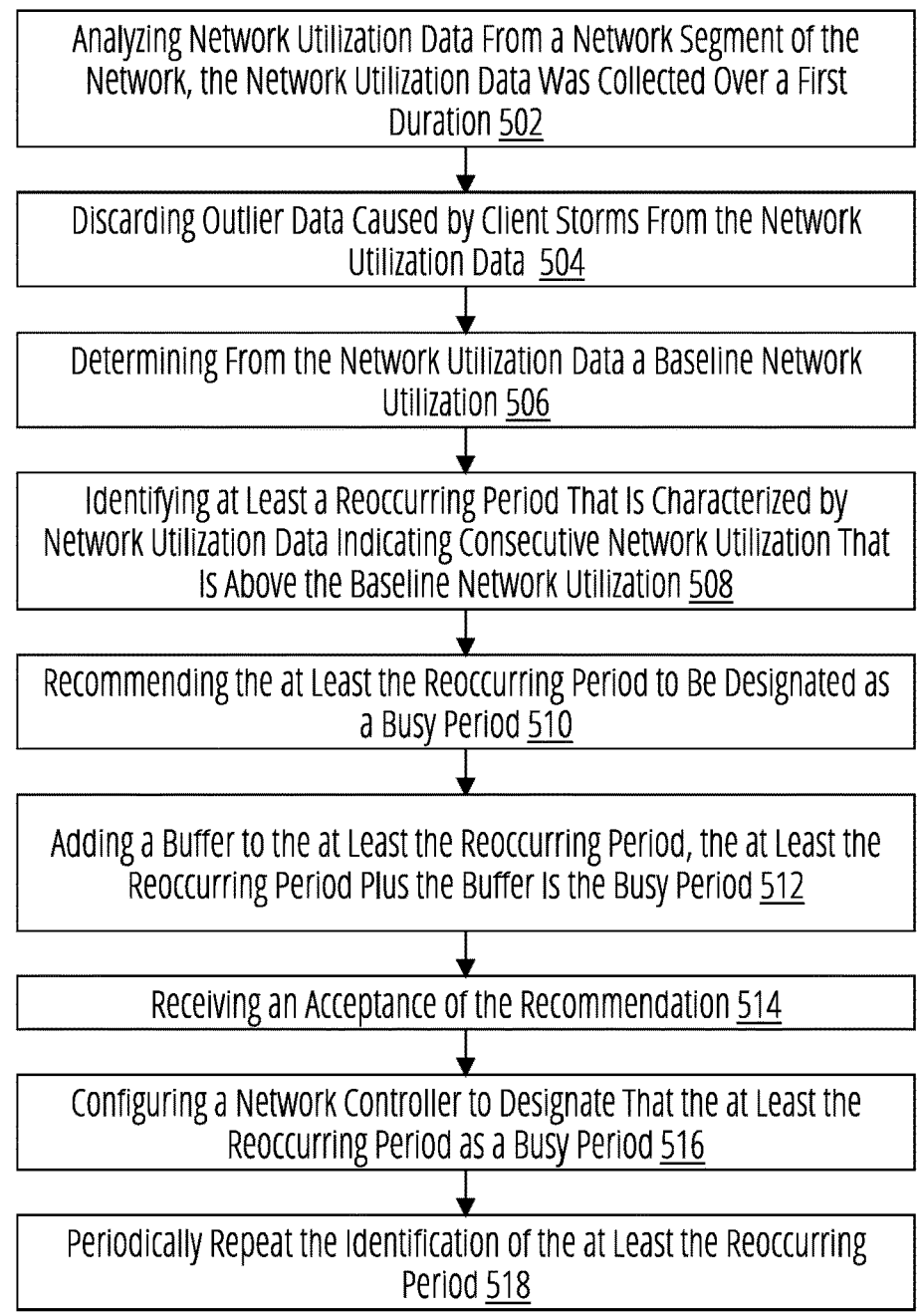
FIG. 5 illustrates a flowchart of an example process for identifying periods of high network connectivity in the AI-RRM network according to some aspects of the present technology.

FIG. 5 illustrates a flowchart of an example process for identifying periods of high network connectivity in the AI-RRM network according to aspects of the present disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed herein, it can be useful to understand trends pertaining to network utilization. For example, it can be useful to avoid making significant configuration changes to the network during periods of high utilization since the configuration changes could result in connection interruptions being experienced by client devices. However, it may be too simplistic to designate a static configuration indicating likely period of high utilization because network trends can change over time.

Another reason it can be useful to understand trends pertaining to network utilization is to adjust the configuration of the network to tolerate degraded KPIs. For example, an RRM algorithm can be subject to a hysteresis factor that can bias the network against making updates to network configurations in some periods, and bias the network toward aggressively improving the network in other periods. Additionally, the network can prefer different types of network configurations at different times of day. All of these configurations can be dynamic based off of changes trends in network utilization. According to some examples, the method includes analyzing network utilization data from a network segment of the network, the network utilization data was collected over a first duration at block 502. For example, the AI Core 108 illustrated in FIG. 1 may analyze network utilization data from a network segment of the network, the network utilization data was collected over a first duration. The network segment may be a specific region of the network, such as a certain floor, wing, building, department, any combination thereof, or the like. The network utilization data may be gathered consistently over a set duration determined by the network or a network administrator (e.g., 24 hours, one week, etc.). The goal of the network utilization data collection is to recognize patterns in the network over time. These patterns may emerge after varying durations of time, thus the length of the data collection period may vary depending on the network. Some networks may require a month of data collection before patterns emerge in the data, while some networks may require a week of data collection. The network utilization data may be pertaining to one or more aspects of the network, including, but not limited to, number of connected clients at any given time, number of client disconnects, network usage, network speeds, any combination thereof, or the like. As networks can be highly dynamic and each network is unique, a high degree of variability can be observed when collecting network utilization data. It can be important to identify outlier data when determining trends. For example, a period designed as a non-busy period should not be discarded just because there is a spike in network utilization for an hour on just one day or a monitored period.

According to some examples, the method includes discarding outlier data caused by client storms from the network utilization data at block 504. For example, the AI Core 108 illustrated in FIG. 1 may discard outlier data caused by client storms from the network utilization data. Client storms may be defined as a large, simultaneous, and/or unusual amount of clients connecting and/or disconnecting from the network. The client storm may move from one network segment to another network segment. For example, a group of users that are usually connected to network segments corresponding to floors of a building might all converge to one network segment corresponding to an auditorium or a cafeteria.

Client storms may be identified by comparing a potential client storm data to historical network utilization data. The AI Core 108 may recognize the disparity between the potential client storm and the typical network utilization for that time period, network segment, etc. and discard the potential client storm data so it is not included in the busy hours analysis. If a client storm is included, the subsequently identified busy hours may be skewed in a manner that is not reflective of the network's actual needs and traffic. As an illustrative example, a client storm may occur when a large meeting is held in one network segment, where an unusually large amount of clients join and subsequently remove themselves from the network segment. The AI Core 108 may recognize this atypical network activity and discard the data to maintain accuracy and consistency.

Other outlier data may occur due to one or more outside factors (e.g., a large number of clients move from one network segment to another network segment when testing is performed on the network, etc.). The outlier data may cause discrepancies and inconsistencies in the data, thus should also be discarded to ensure data accuracy. The method disclosed herein may determine the outlier data caused by a "client storm," or the like, and may remove it from the network utilization data.

In order to accurately identify period of high utilization, it is important to recognize that a network might always be somewhat heavily utilized because some number of devices are persistently connected to the network. Therefore, in order to detect busy periods, it is important to identify a baseline network utilization.

According to some examples, the method includes determining from the network utilization data a baseline network utilization at block 506. For example, the AI Core 108 illustrated in FIG. 1 may determine, from the network utilization data, a baseline network utilization. The baseline network utilization being a persistent quantification of network utilization present throughout a duration of time.

By determining the baseline network utilization, the present technology is able to more accurately identify the busy hours within the network. Traditional methods of determining "busy periods" may only reference "zero connectivity" as their baseline, as opposed to referencing a baseline network utilization. By doing this, the traditional method may incorrectly identify periods of low network connectivity as periods of high connectivity due to the disparity between the baseline network utilization and "zero connectivity." Using the traditional method, a period of low connectivity may be perceived as a period of high connectivity due to the larger difference between the period of low connectivity and "zero connectivity" than the period of low connectivity and baseline network utilization. This mistaken identification may lead to incorrect busy hours identification, thus resulting in inaccurate RRM updates and configurations that could occur at inopportune times for the network.

The baseline network utilization may be comprised of pseudo-steady clients on the network. Pseudo-steady clients are clients connected to the network indefinitely (e.g., printers, cameras, phones, sensors, etc.) and are rarely disconnected from the network. In some embodiments, the number of pseudo-steady clients constitutes a baseline network utilization. The number of connected clients at any given time period may be compared to the baseline network utilization in order to identify busy periods. Machine learning may be used to identify pseudo-steady clients on the network.

According to some examples, the method includes identifying at least a reoccurring period that is characterized by network utilization data indicating consecutive network utilization that is above the baseline network utilization at block 508. For example, the AI Core 108 in FIG. 1 may identify at least a reoccurring period that is characterized by network utilization data indicating consecutive network utilization that is above the baseline network utilization. The reoccurring period is one in which the network is supporting more network traffic than in other periods and/or is one in which the network is supporting more connected devices than in other periods.

The disclosed technology may determine operational connectivity patterns through analyzing the network connectivity data. The operational connectivity patterns may be evident through identifying a reoccurring duration where the network connectivity is relatively high compared to the baseline network utilization. The present technology may determine the reoccurring duration by identifying the shortest subarray that identifies consecutive periods of time when clients are joining the network and when the clients are leaving the network. In some embodiments, the reoccurring duration may be determined by an administrator of the network or network settings. For example, the network may be configured to identify reoccurring durations of 30 minutes, two hours, six hours, etc. that would then be identified as "busy periods." For example, if the network was configured to identify reoccurring durations of one hour, then the network would seek to identify reoccurring periods of one hour or more that contained a higher level of connectivity than the baseline network connectivity. Identifying reoccurring durations is an additional measure to eliminate outliers. For example, if users within a network segment connected to the network on an atypical day, such as a Saturday morning, due to some unforeseen circumstances, Saturday mornings would not be identified as busy hours because the activity would not be reoccurring.

Identifying the reoccurring period may be performed by a trained machine learning model. In some embodiments, there may be more than one period in which the network is supporting more clients when compared to other periods. As an illustrative example, the network may identify a two-hour period in the morning and a three-hour period in the afternoon and determine that both periods are times in which the network is supporting more connected devices than in other periods.

In some embodiments, the network topography may affect the present technology. The reoccurring period may be specific to one segment of the network, based on network topography. Some areas of the network may have high network connectivity at different times.

For example, one building within a network may work primarily at night, while another building in the network may work during the day. As another example, one department of a network may work frequently on weekends, while another department may work a standard five-day work week. The present technology may identify additional reoccurring periods of high network connectivity for additional, respective segments of the network. The reoccurring periods may not be identical. For example, one building connected to the network may have a reoccurring period of high network connectivity in the morning while a second building may have a reoccurring period of high network connectivity in the afternoon.

As another illustrative example, the present technology may identify a busy period for one segment of the network as 8 am to 5 pm, while the present technology may identify a busy period for a second segment of the network as 10 am to 7 pm. The segments of the network may be segmented narrowly or broadly (e.g., by floor of a building, by building, by hallway, by cubicle grouping, etc.). The network topography may be integrated to ensure optimum performance for the entirety of the network. By using network topography, each segment of the network may receive RRM updates that apply specifically to the respective network segment. This ensures that each segment is only receiving updates pertinent to the respective segment, and not receiving updates and wasting energy on updates that will not improve performance.

According to some examples, the method includes recommending the at least the reoccurring period to be designated as a busy period at block 510. For example, the AI Core 108 illustrated in FIG. 1 may recommend the at least the reoccurring period to be designated as a busy period. There may be more than one busy period in a day.

The present technology may make recommendations for multiple network segments. In some embodiments, the network segment may be a first segment the network, and the busy period may be determined for the first segment of the network, and a next busy period may be determined for at least one second segment of the network. There may be more than one busy period designated for an entire network, wherein busy periods may be associated with respective segments of the network. For example, the present technology may recommend a morning busy period for a first segment and an afternoon busy period for a second segment. The busy period may be a split-manner busy period, wherein the network may have more than one busy period with a shorter, non-busy period between the busy periods sequentially. For example, the present technology may identify a busy period from 8 am to 11 am, a non-busy period from 11 am to 12 pm, and another busy period from 12 pm to 5 pm. Alternatively, the busy period may be continuous, where there is no shorter, non-busy period.

According to some examples, the method includes adding a buffer to the at least the reoccurring period, the at least the reoccurring period plus the buffer is the busy period at block 512. For example, the AI-RRM system network illustrated in FIG. 1 may add a buffer to the at least the reoccurring period; the at least the reoccurring period plus the buffer is the busy period. The buffer may allow for tolerance in the busy periods, such that RRM updates may not be deployed if there are clients connected slightly before or slightly after the reoccurring period identified by the method disclosed herein. The buffer allows for flexibility within the identified busy period. For example, a client that connects slightly before or slightly after the busy period may not be affected by any RRM updates because of the buffer period.

The busy period (with the addition of the buffer) may be a period in which non-urgent updates should be deferred.

The buffer may be determined by the network controller or by an administrator of the network. The buffer may vary depending on a number of factors, including, but not limited to, time of year, nature of the network, needs of the clients, etc. For example, a network may expand the buffer period during anticipated high connectivity periods for the network, such as tax season, the holiday season, end of the fiscal year, any combination thereof, or the like.

According to some examples, the method includes receiving an acceptance of the recommendation at block 514. For example, the AI-RRM system network illustrated in FIG. 1 may receive an acceptance of the recommendation. The acceptance may be from an administrator of the network, the network controller, a machine learning element (e.g., AI Core), any combination thereof, or the like. If the recommendation is rejected by any means, the present technology may start the process from the beginning at block 502, may default to a preset busy period setting, eliminate any use of a busy period altogether, notify an administrator of the network that manual input of a busy period is required, any combination thereof, or the like. In some embodiments, the busy period can be automatically accepted and applied without explicit action by a network administrator.

According to some examples, the method includes configuring a network controller to designate that the at least the reoccurring period as a busy period at block 516. For example, the AI-RRM system network illustrated in FIG. 1 may configure a network controller to designate that the at least the reoccurring period as a busy period. The reoccurring period may include the buffer period. The network controller may designate the busy period as a period of time in which non-urgent RRM updates may be deferred. Time periods that are not designed as busy period (i.e., non-busy periods) may be periods in which the network controller performs RRM configurations and updates. If RRM updates were scheduled before the busy periods were established by the present technology, the scheduled updates will be rescheduled to fit within a non-busy period. Timing of RRM updates may differ in various segments of the network according to the network topography. For example, a non-busy period containing scheduled RRM updates may occur at a different time for a first network segment than a second network segment (e.g., RRM updates scheduled for 8 pm at the first network segment and RRM updates scheduled for 2 am at the second network segment).

According to some examples, the method includes periodically repeating the identification of the at least the reoccurring period at block 518. For example, the AI-RRM system network illustrated in FIG. 1 may periodically repeat the identification of the at least the reoccurring period. The periods of high connectivity for a network or network segment may change over time. Networks, depending on the time of year, seasons, economy, or other internal and/or external variables, may require changes in the busy periods in order to provide optimum performance to clients. The busy period recognized by the network controller can be adjusted over time to account for changing patterns in the network utilization data. The busy period calculation may be repeated for an entire network or for one or more network segments. The present invention may be performed periodically (e.g., every two weeks, every three months, yearly, etc.). The periodic performance of the present invention allows the network to adapt according to the needs of the client and ensure that RRM updates are minimally interrupting client connectivity.

For example, a network that exists in an educational environment, such as a university, may have large disparities in busy periods throughout the year (e.g., much less network connectivity over the summer months, less network connectivity over winter holiday breaks, increased network connectivity during final exam periods, etc.) and the reoccurring period(s) may need to be recalculated to ensure the network is operating properly and client connectivity is not being disrupted. As another example, a network that exists in a retail environment may require longer busy periods during the holiday shopping season and the reoccurring period(s) may need to be recalculated at the start of the holiday shopping season to ensure optimum performance. Other factors, such as changing work-from-home policies and/or non-traditional work week structures, may also impact how frequently the reoccurring period(s) may need to be recalculated.

Figure 6:
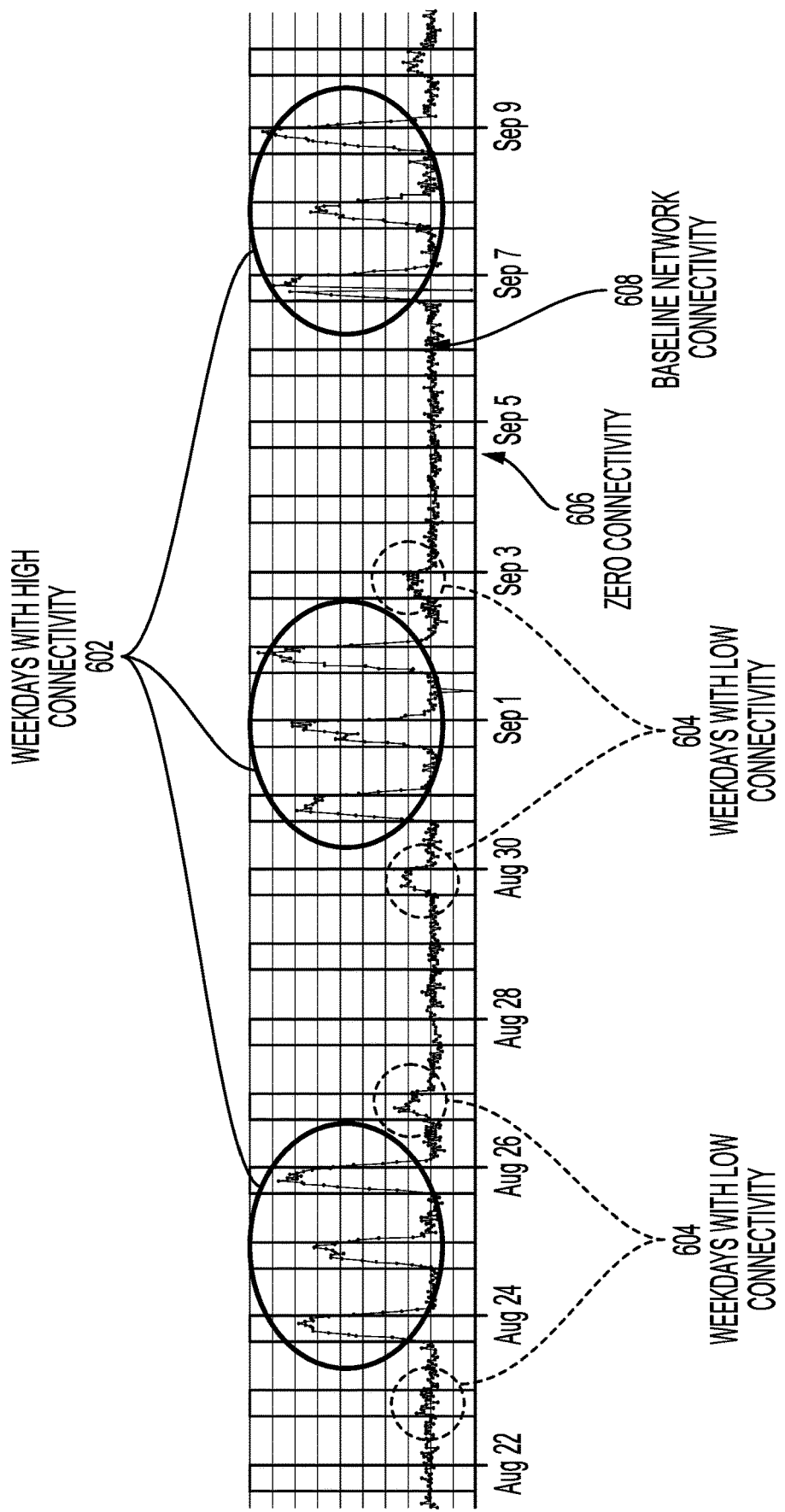
FIG. 6 illustrates an example graph demonstrating periods of high and low connectivity on a wireless network during network utilization data gathering according to some aspects of the present technology.

FIG. 6 illustrates an example graph demonstrating periods of high and low connectivity on a wireless network during a period of network utilization data gathering according to aspects of the present disclosure. The data points shown in FIG. 6 are the number of connected clients over time. Although the graph demonstrates a particular pattern of periods of high network connectivity and periods of low connectivity, this graph is for mere demonstration only and is not meant to limit, in any way, the scope of the present disclosure.

The present technology may identify periods of high connectivity (e.g., weekdays with high connectivity 602). Weekdays with high connectivity 602 indicate that a comparatively large amount of clients connected to and subsequently disconnected from the network within a similar timeframe. The method disclosed herein may identify weekdays with high connectivity 602 as reoccurring periods and may identify the reoccurring periods as busy periods. The system may defer all non-urgent RRM updates and configurations to a time period outside of the busy periods.

Weekdays with low connectivity 604 demonstrates periods of time that are not considered busy periods (i.e., non-busy periods). The network did not facilitate a large amount of clients, relative to the clients shown on weekdays with high connectivity 602, on weekdays with low connectivity 604. The network may designate weekdays with low connectivity 604 as non-busy periods (i.e., not identify the periods as a "busy period") and designate RRM configurations to take place on weekdays with low connectivity 604 due to the low amount of client connectivity, which may translate to less client disconnects during the RRM configurations.

The graph in FIG. 6 demonstrates a non-traditional client connectivity pattern. Without implemented the method disclosed herein, the standard, predetermined "busy periods" would have been designated as all weekdays. By determining the busy periods using the method disclosed herein, weekdays with low connectivity 604 may not be identified as a busy period. Thus, the network may save energy output and power on weekdays with low connectivity 604 and RRM configurations may be performed over weekdays with low connectivity 604.

Baseline network connectivity 608 demonstrates the consideration of pseudo-steady clients in the method disclosed herein. As shown in FIG. 6, the baseline network connectivity is higher than zero connectivity 606, which represents the level that the graph would show if there were no clients connected to the network. Baseline network connectivity 608 may remain predominantly constant over time. Weekdays with low connectivity 604 may be compared to baseline network connectivity 608 and weekdays with high connectivity 602 when a determination is made as to if weekdays with low connectivity 604 is a busy period.

Figure 7A:
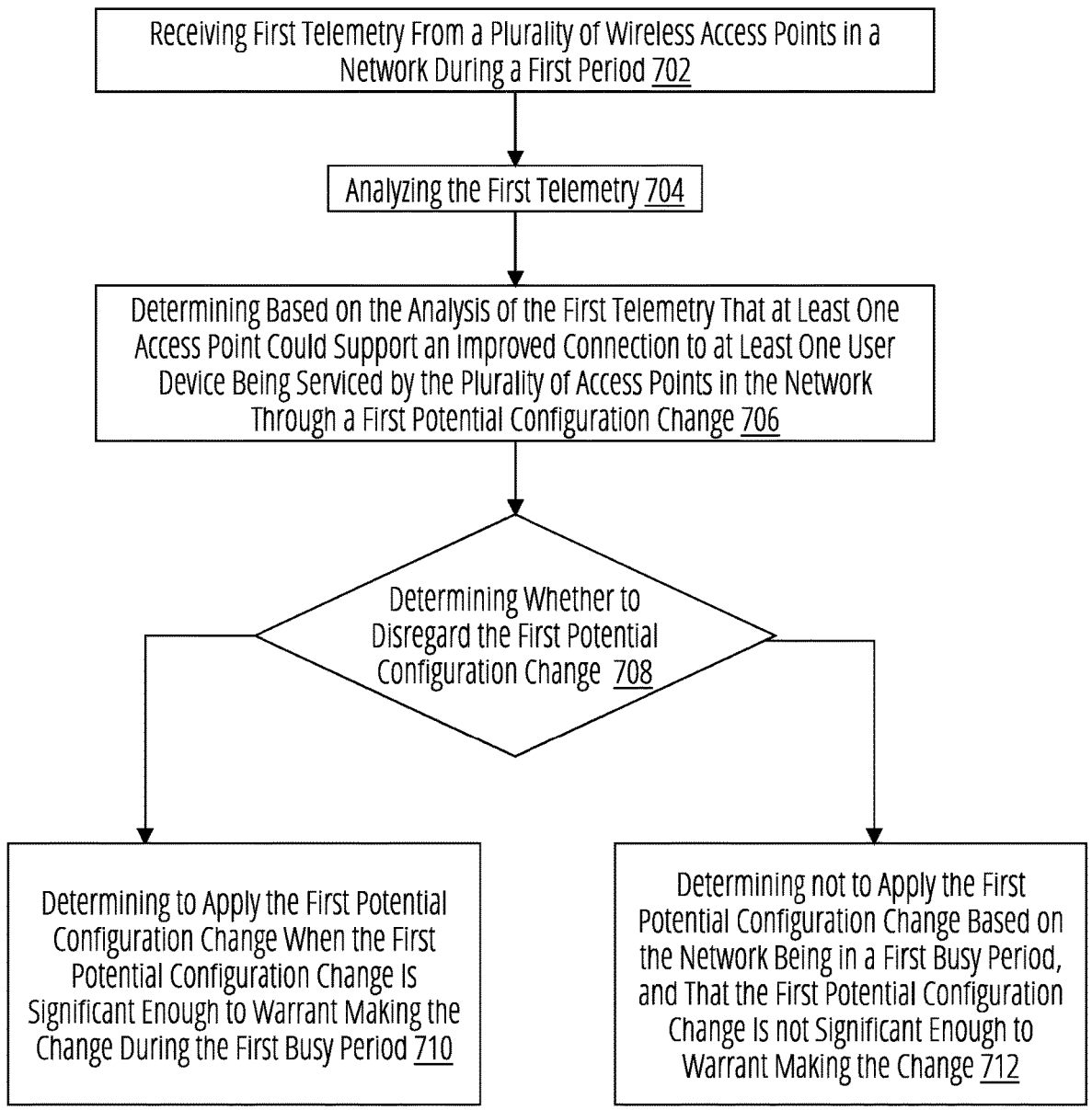
FIG. 7A illustrates a flowchart of an example process for identifying RRM updates during a busy period in the AI-RRM network according to aspects of the present technology.

FIG. 7A illustrates a flowchart of an example process for identifying RRM updates during a busy period in the AI-RRM network according to aspects of the present disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The present technology includes three periods in which RRM updates and configurations may take place: a first period, a third period, and a fourth period. The individual periods may be associated with respective hysteresis values. The hysteresis value may be any real number between zero and one, wherein zero represents the lowest hysteresis and one represents the highest hysteresis. Hysteresis is a measure of the resistance of the network to deploying RRM updates. There may be one or more factors that are reflected in the hysteresis value at any particular time, such as the number of clients connected to the network, the size of the network, how long a typical client is connected to the network, whether the particular time falls within a busy period or non-busy period, any combination thereof, or the like. For example, during a busy period of the network, the hysteresis value may be a 0.85, indicating a high resistance to deploying RRM updates. During a non-busy period, the same network may be associated with a hysteresis value of 0.1, indicating a low resistance to deploying RRM. As another illustrative example, a network associated with a retail store may be associated with a hysteresis value of 0.5 during a busy hour period due to the dynamic nature of clients connecting and disconnecting frequently, and therefore the clients would not be impacted as heavily by an RRM update.

The hysteresis level may be programmed by a network administrator, network controller, AI/ML algorithm, any combination thereof, or the like. The hysteresis level may be dynamic, wherein the hysteresis level may be altered in real-time according to the needs of the network. For example, a network may be associated with a hysteresis level of 0.9 at the start of a busy period, but may drop to a 0.7 as some clients disconnect earlier than anticipated.

Figure 9:
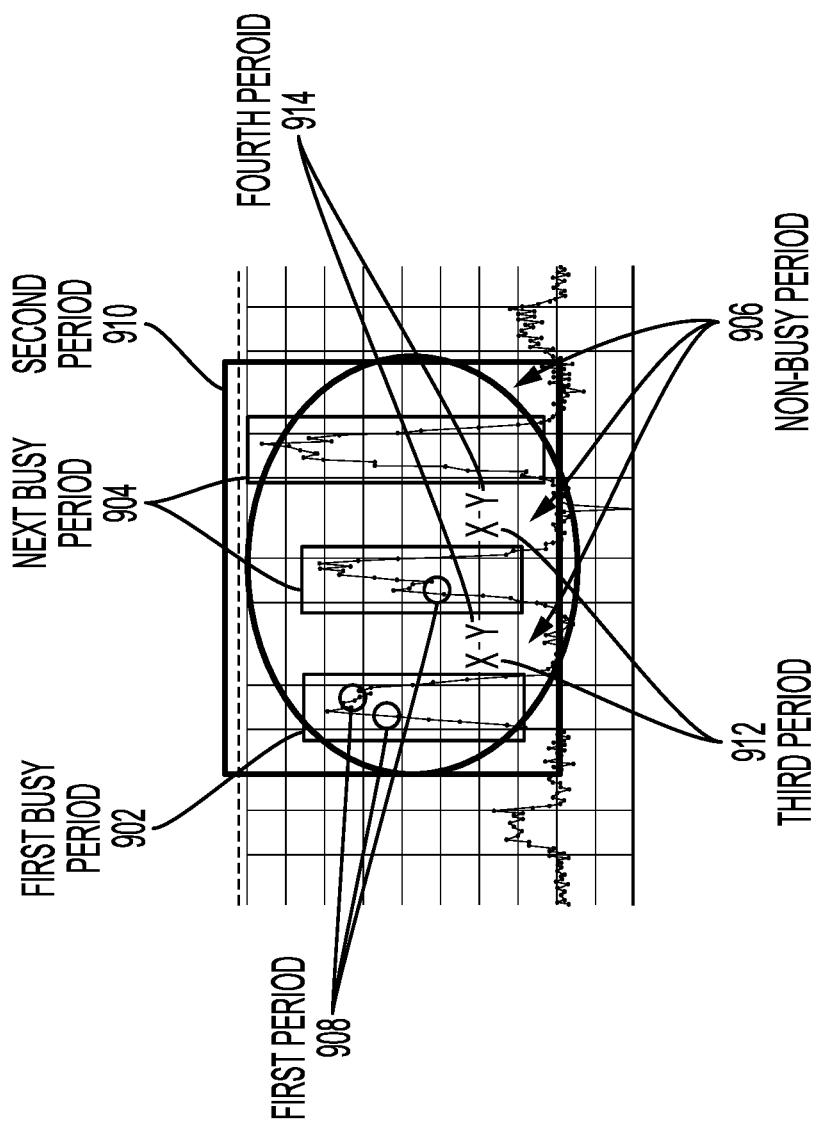
FIG. 9 illustrates an example graph demonstrating various periods according to some aspects of the present technology.

As shown in FIG. 9, the first period can occur during a busy period, wherein the present technology may be associated with a high hysteresis and is therefore resistant to deploying updates unless the updates are significant. If the updates are not significant, the updates may be deferred to the third period or the fourth period. Issues that are significant enough to overcome the high hysteresis that arise during the respective busy period may be remedied immediately during the first period. The third period may occur following the end of the busy period and may be associated with a low hysteresis. The RRM updates and configurations that may occur at the third period may be RRM updates that includes remedies for network issues identified over a longer time span, such as seven days. These updates may be perceived as long-term updates. The fourth period may occur shortly before the start of a next busy period and may be associated with a lowest hysteresis, wherein the hysteresis associated with the first and third period may be higher than the hysteresis associated with the fourth period. The RRM updates that may occur at the fourth period may include a modified version of the updates deployed at the third period. The RRM updates that may occur at the fourth period may include more fine-tuned and precise updates that target specific issues that arise during the prior busy period and/or issues that were deferred at the first period.

According to some examples, the method includes receiving first telemetry from a plurality of wireless access points in a network during a first period at block 702. For example, the AI Core 108 illustrated in FIG. 1 may receive first telemetry from a plurality of wireless access points in a network during a first period. The network is a first network neighborhood of an enterprise network. The first period may be within a busy period and of any duration of time less than the busy period. There may be more than one first period within a busy period. The first telemetry may include information pertaining to the network over the first period, such as connectivity, network status, number of clients, and/or any other pertinent data related to the network operations.

According to some examples, the method includes analyzing the first telemetry at block 704. For example, the AI Core 108 illustrated in FIG. 1 may analyze the first telemetry. Analyzing may include deciphering the first telemetry and pulling out data that may be used to generate applicable RRM updates. This step may also include eliminating outlier data that would disrupt the accuracy of the resulting RRM updates, such as the aforementioned client storms.

According to some examples, the method includes determining, based on the analysis of the first telemetry, that at least one access point could support an improved connection to at least one user device being serviced by the plurality of access points in the network through a first potential configuration change at block 706. For example, the AI Core 108 illustrated in FIG. 1 may determine based on the analysis of the first telemetry that at least one access point could support an improved connection to at least one user device being serviced by the plurality of access points in the network through a first potential configuration change. For example, if the analysis shows that at least one AP of the network could benefit from an RRM update in order to improve connectivity to at least one user device connected to the AP, then the present technology may calculate and determine an appropriate RRM update or configuration to perform on the network. Any sort of minute potential improvement may trigger determination of an appropriate RRM update remedy. In some embodiments, the RRM update may seek to remedy one or more network issues identified in the first telemetry. In some embodiments, instead of the AI Core 108, the analysis of the telemetry and the determining to disregard the potential configuration change is performed by a local RRM controller.

According to some examples, the method includes determining whether to disregard the first potential configuration change at decision block 708. For example, the AI Core 108 illustrated in FIG. 1 may determine whether to disregard the first potential configuration change. Due to the first period occurring during the first busy period, the present invention must determine if the potential improvement identified within the first telemetry is substantial enough to warrant a potential interruption in connectivity during the first busy period.

The substantiality of the potential improvement may be determined by identifying a health score of the network. The health score may incorporate a number of factors, including, but not limited to, frequency of disconnects, speed of connection, reliability of connection, and/or any other variables that reflect the performance of the network. The health score may be updated in real time. The present invention may apply the first configuration change if the health score has fallen below a threshold. The present invention may also identify potential negative impacts of applying the first configuration change during a busy period. Applying the RRM update may cause client disconnects, thus the potential negative impact may include the number of APs affected by the first configuration change, the current number of clients connected to the network via the number of APs affected by the first configuration change, and/or any other relevant factor. The present invention may also gather data related to the issues addressed within the first potential configuration change. For example, the present invention may identify the number of dropped connections due to the issue, the number of affected APs, the bandwidth or latency being reported by clients, etc. The present invention may utilize this data to determine whether the severity of the issue addressed within the first configuration change outweighs the potential negative impact of deploying an RRM update during a busy period.

According to some examples, the method includes determining to apply the first potential configuration change when the first potential configuration change is significant enough to warrant making the change during the first busy period at block 710. For example, the AI Core 108 illustrated in FIG. 1 may determine to apply the first potential configuration change when the first potential configuration change is significant enough to warrant making the change during the first busy period. As previously mentioned, the present technology may utilize a network health score, determine if the potential negative impact outweighs the severity of the issue addressed by the first potential configuration, determine how many APs and/or clients are impacted by the issue addressed by the first potential configuration, any combination thereof, or the like. A significance determination by the present technology alone may be overridden by manual input from a network administrator or another external party.

According to some examples, the method includes determining not to apply the first potential configuration change based on the network being in a first busy period, and that the first potential configuration change is not significant enough to warrant making the change at block 712. For example, the AI Core 108 illustrated in FIG. 1 may determine not to apply the first potential configuration change based on the network being in a first busy period, and that the first potential configuration change is not significant enough to warrant making the change. As previously mentioned, the present technology may utilize a network health score, determine if the potential negative impact outweighs the severity of the issue addressed by the first potential configuration, determine how many APs and/or clients are impacted by the issue addressed by the first potential configuration, any combination thereof, or the like. The present technology may push the first potential configuration change to occur during a non-busy period. A significance determination by the present technology alone may be overridden by manual input from a network administrator or another external party.

Figure 7B:
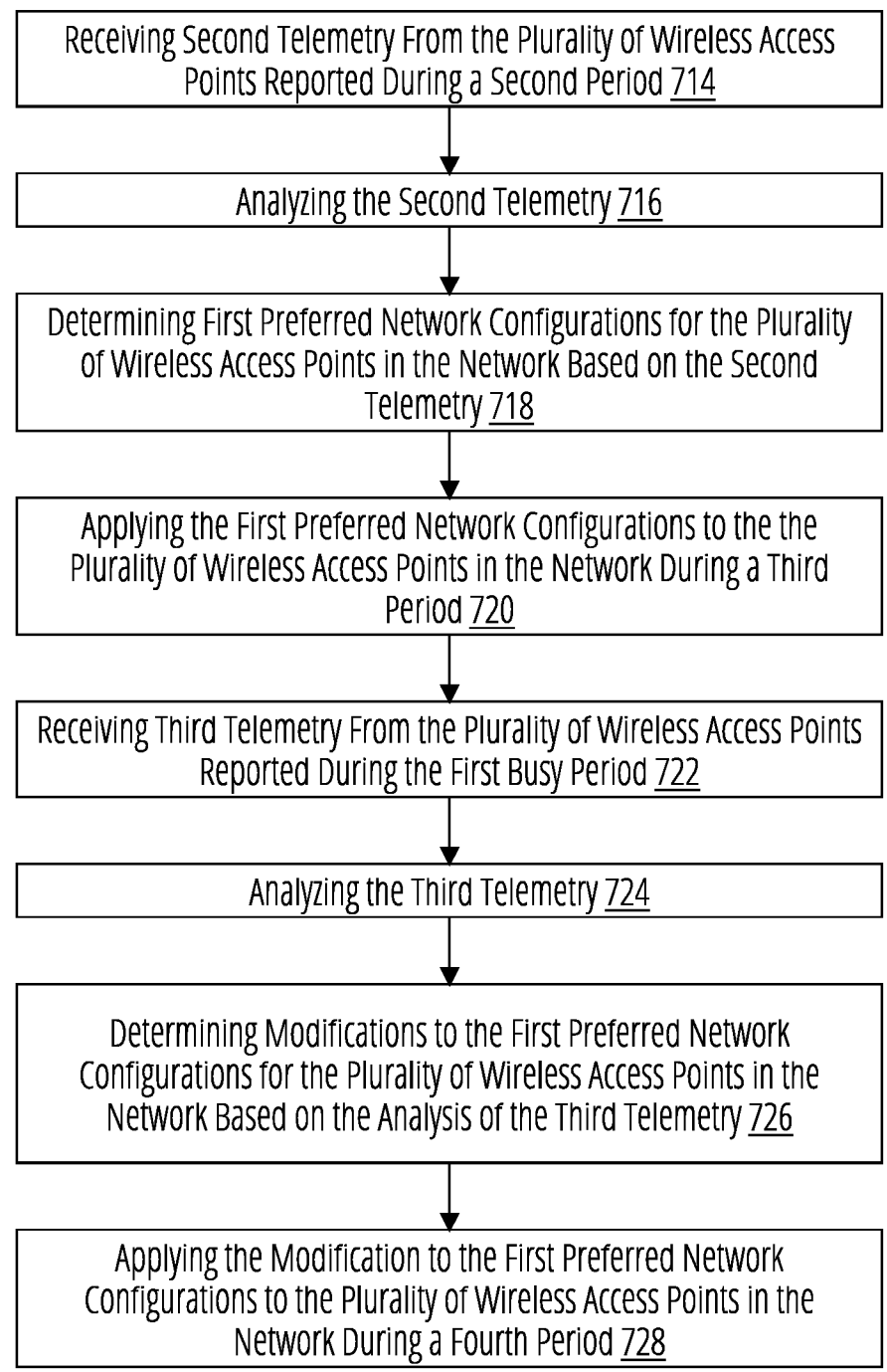
FIG. 7B illustrates a flowchart of an example process for identifying and deploying RRM updates in the AI-RRM network according to some aspects of the present technology.

FIG. 7B illustrates a flowchart of an example process for identifying and deploying RRM updates in the AI-RRM network according to aspects of the present disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving second telemetry from the plurality of wireless access points reported during a second period at block 714. For example, the AI Core 108 illustrated in FIG. 1 may receive second telemetry from the plurality of wireless access points reported during a second period. The second period may include data from several busy periods including the first busy period. The second period may shift to constantly span the previous seven days. The second telemetry may include information pertaining to the network over the second period, such as connectivity, network status, number of clients, and/or any other pertinent data related to the network operations.

According to some examples, the method includes analyzing the second telemetry at block 716. For example, the AI Core 108 illustrated in FIG. 1 may analyze the second telemetry. Analyzing may include deciphering the second telemetry and pulling out data that may be used to generate applicable RRM updates or calibrate the first potential configuration change. This step may also include eliminating outlier data that would disrupt the accuracy of the resulting RRM updates or calibrations.

According to some examples, the method includes determining first preferred network configurations for the plurality of wireless access points in the network based on the second telemetry at block 718. For example, the AI Core 108 illustrated in FIG. 1 may determine first preferred network configurations for the plurality of wireless access points in the network based on the second telemetry. The present technology may utilize the second telemetry to generate the first preferred network configuration that contains telemetry data over a duration of time longer than one busy period. The first preferred network configuration may be more comprehensive than the first potential configuration change due to the increased amount of telemetry data. For example, the first potential configuration change may include more precise changes to improve the network and the first preferred network configuration may include changes that span a larger number of APs and/or clients.

According to some examples, the method includes applying the first preferred network configurations to the plurality of wireless access points in the network during a third period at block 720. For example, the AI Core 108 illustrated in FIG. 1 may apply the first preferred network configurations to the plurality of wireless access points in the network during a third period. The third period may be during a non-busy period. The third period may occur near the start of the non-busy period. The first preferred network configurations configure the network and prepare the network for the next busy period to ensure optimum performance for clients. The third period may occur any length of time before the next busy period, so long as it is less than the applicable non-busy period and is near the start of the non-busy period (e.g., thirty minutes after the start of the non-busy period).

According to some examples, the method includes receiving third telemetry from the plurality of wireless access points reported during the first busy period at block 722. For example, the AI Core 108 illustrated in FIG. 1 may receive third telemetry from the plurality of wireless access points reported during the first busy period. The third telemetry may include the first telemetry. The third telemetry may contain the network data pertaining to the first busy period. The third telemetry may span the first busy period. The third telemetry may include information pertaining to the network over the first busy period, such as connectivity, network status, number of clients, and/or any other pertinent data related to the network operations.

According to some examples, the method includes analyzing the third telemetry at block 724. For example, the AI Core 108 illustrated in FIG. 1 may analyze the third telemetry. Analyzing may include deciphering the third telemetry and pulling out data that may be used to generate applicable RRM updates. This step may also include eliminating outlier data that would disrupt the accuracy of the resulting RRM updates, such as the aforementioned client storms.

According to some examples, the method includes determining modifications to the first preferred network configurations for the plurality of wireless access points in the network based on the analysis of the third telemetry at block 726. For example, the AI Core 108 illustrated in FIG. 1 may determine modifications to the first preferred network configurations for the plurality of wireless access points in the network based on the analysis of the third telemetry. The third telemetry data may include updates that may improve the network in the short term, while the second telemetry data may include updates that improve the network in the long term. Modifying the first preferred network configuration with the third telemetry data may generate an increasingly thorough RRM update by including not only reoccurring issues in the network identified in the second telemetry data, but also including specific, precise issues in the network in the third telemetry data.

The third telemetry data may be calibrated by the first preferred network configurations and/or second telemetry data before modifying the first preferred network configurations. The calibration of the third telemetry data may stabilize any erratic or unnecessary updates intended to modify issues that may not reoccur on the network that occurred during the first busy period. This calibration may prevent unnecessary or drastic updates to the network.

According to some examples, the method includes applying the modification to the first preferred network configurations to the plurality of wireless access points in the network during a fourth period at block 728. For example, the AI Core 108 illustrated in FIG. 1 may apply the modification to the first preferred network configurations to the plurality of wireless access points in the network during a fourth period. The fourth period may occur during a non-busy period. The fourth period may occur after the third period, and the fourth period may occur at least a determined amount prior to a start of a next busy period.

The third telemetry data may be used to fine-tune the first preferred network configurations, generating a modified first preferred network configuration. The present technology may apply the modified first preferred network configuration at a period after the third period (i.e., the fourth period) but before the next busy hour starts. This update ensures that the network is fully configured according to a wide array of network data (i.e., first, second, and third telemetry data).

Figure 8:
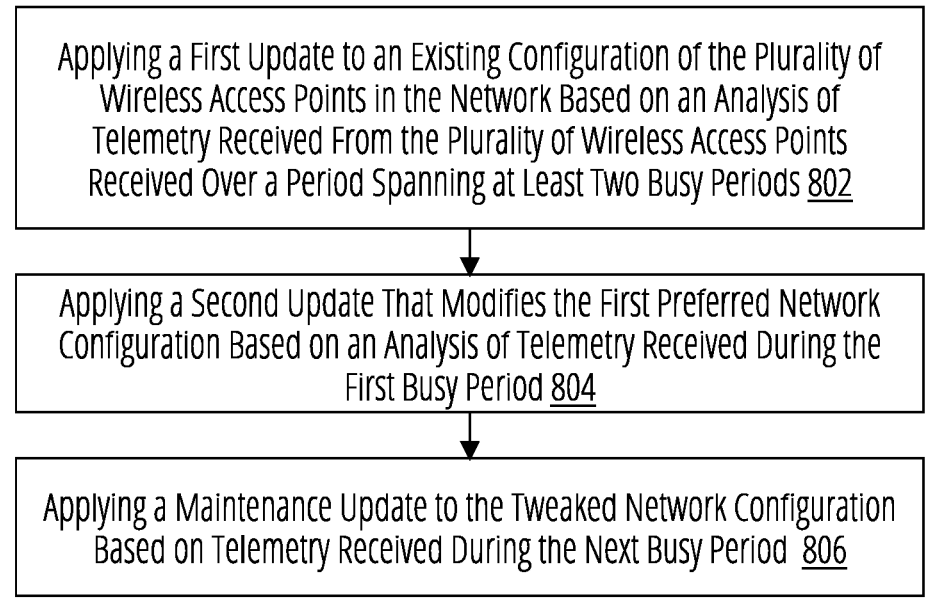
FIG. 8 illustrates an example flowchart for applying the RRM updates corresponding to the first preferred network configuration, a modification of the first preferred network configuration, and a maintenance update according to some aspects of the present technology.

FIG. 8 illustrates an example routine for applying the RRM updates corresponding to the first preferred network configuration, a modification of the first preferred network configuration, and the first potential configuration change (i.e., maintenance update). Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes applying a first update to an existing configuration of the plurality of wireless access points in the network based on an analysis of telemetry received from the plurality of wireless access points received over a period spanning at least two busy periods at block 802. For example, the AI Core 108 illustrated in FIG. 1 may apply a first update to an existing configuration of the plurality of wireless access points in the network based on an analysis of telemetry received from the plurality of wireless access points received over a period spanning at least two busy periods.

The first update may include second telemetry data and/or the first preferred network configurations of FIG. 7B.

The first update may configure the network and prepare the network for the next busy period to ensure optimum performance for clients. The first update may contain RRM updates and configurations that can be more comprehensive and applicable to a relatively longer duration of time. The update is applied a short period after termination of the first busy period and during a non-busy period. For example, the first update may be applied thirty minutes after the end of the first busy period. The first update to the existing configuration puts the plurality of wireless access points in the network to a first preferred network configuration. The network is configured for general operation.

According to some examples, the method includes applying a second update that modifies the first preferred network configuration based on an analysis of telemetry received during the first busy period at block 804. For example, the AI Core 108 illustrated in FIG. 1 may apply a second update that modifies the first preferred network configuration based on an analysis of telemetry received during the first busy period. The modified first preferred network configuration may include deferred updates identified by the present invention during the first busy period. The second update is applied during the non-busy period after the first update. For example, the second update may be applied third minutes before the start of the next busy period or one hour after the first update.

The network configuration is tweaked to prepare for a next busy period based on telemetry from the first busy period, such as the third telemetry identified in FIG. 7A. The tweaked network configuration may include more targeted and precise RRM updates when compared to the first update, which generally configures the network for operation. The second update is intended to prepare the network for the next busy period and include telemetry data from the first busy period and historical telemetry data.

According to some examples, the method includes applying a maintenance update to the tweaked network configuration based on telemetry received during the next busy period at block 806. For example, the AI Core 108 illustrated in FIG. 1 may apply a maintenance update to the tweaked network configuration based on telemetry received during the next busy period. The maintenance update is applied during the next busy period when the maintenance update is significant enough to warrant making the change during the next busy period.

Determining significance of a maintenance update may be determined by identifying a health score of the network. The health score may incorporate a number of factors, including, but not limited to, frequency of disconnects, speed of connection, reliability of connection, and/or any other variables that reflect the performance of the network. The health score may be updated in real time. The present invention may apply the maintenance update if the health score has fallen below a threshold. The present invention may also identify potential negative impacts of applying the maintenance update during the next busy period. Applying the RRM update may cause client disconnects, thus the potential negative impact may include the number of APs affected by the maintenance update, the current number of clients connected to the network via the number of APs affected by the maintenance update, and/or any other relevant factor. The present invention may also gather data related to the issues addressed within the maintenance update. For example, the present invention may identify the number of dropped connections due to the issue, the number of affected APs, the bandwidth or latency being reported by clients, etc. The present invention may utilize this data to determine whether the severity of the issue addressed within the maintenance update outweighs the potential negative impact of deploying an RRM update during the next busy period.

FIG. 9 illustrates an example graph demonstrating the aspects of the present technology discussed throughout, particularly in FIGS. 7A and 7B, related to the AI-RRM network according to aspects of the present disclosure. The data points shown in FIG. 9 are the number of connected clients over time. Although the graph demonstrates a particular pattern of periods of high network connectivity and periods of low connectivity, this graph is for mere demonstration only and is not meant to limit, in any way, the scope of the present disclosure.

The graph shown in FIG. 9 demonstrates a typical, five-day work week, wherein three of the five days have high connectivity. As shown here, Tuesday, Wednesday, and Thursday have high connectivity and Monday and Friday have low connectivity. Thus, since the connectivity on Tuesday, Wednesday, and Thursday is substantially higher than the other days, those working days may be identified as busy periods, and the span of the respective busy periods may depend on the specific hourly connectivity trends. Monday and Friday may be identified as non-busy periods due to the low connectivity as compared to the busy periods (i.e., non-busy period 906).

First busy period 902 may be a first subsequent busy period of high connectivity on the network within the present technology. First period 908 may occur within first busy period 902. The third telemetry illustrated in FIG. 7B may gather data from first busy period 902.

Next busy period 904 may by the next subsequent busy period following first busy period 902. A non-busy period may occur in between first busy period 902 and next busy period 904. Updates that occur at third period 912 and fourth period 914 may be intended to improve operation of the network during next busy period 904 and all subsequent busy periods.

First period 908 may be a period in which a maintenance updates described in FIG. 8 and/or a first potential configuration change described in FIG. 7A may take place. Any network issues identified during first period 908 may be deferred to fourth period 914 if the network issues are not significant enough to warrant an update during a busy period.

Second period 910 may be any period that contains at least two busy periods, including first busy period 902 and at least one busy period occurring prior to first busy period 902. Second period 910 may constitute the duration of the second telemetry discussed in FIG. 7B.

Third period 912 may be a period of time occurring shortly after a busy period. For example, third period 912 may occur 30 minutes after the conclusion of a busy period. Third period 908 may occur prior to fourth period 914. The first preferred network configurations discussed in FIG. 7B and the first update discussed in FIG. 8 may occur during third period 912.

Fourth period 914 may occur shortly before the start of a busy period. For example, fourth period 914 may occur 20 minutes before the beginning of a busy period. Fourth period 914 may occur after third period 912. The modified first preferred network configurations discussed in FIG. 7B and the second update discussed in FIG. 8 may occur during fourth period 914.

Figure 10:
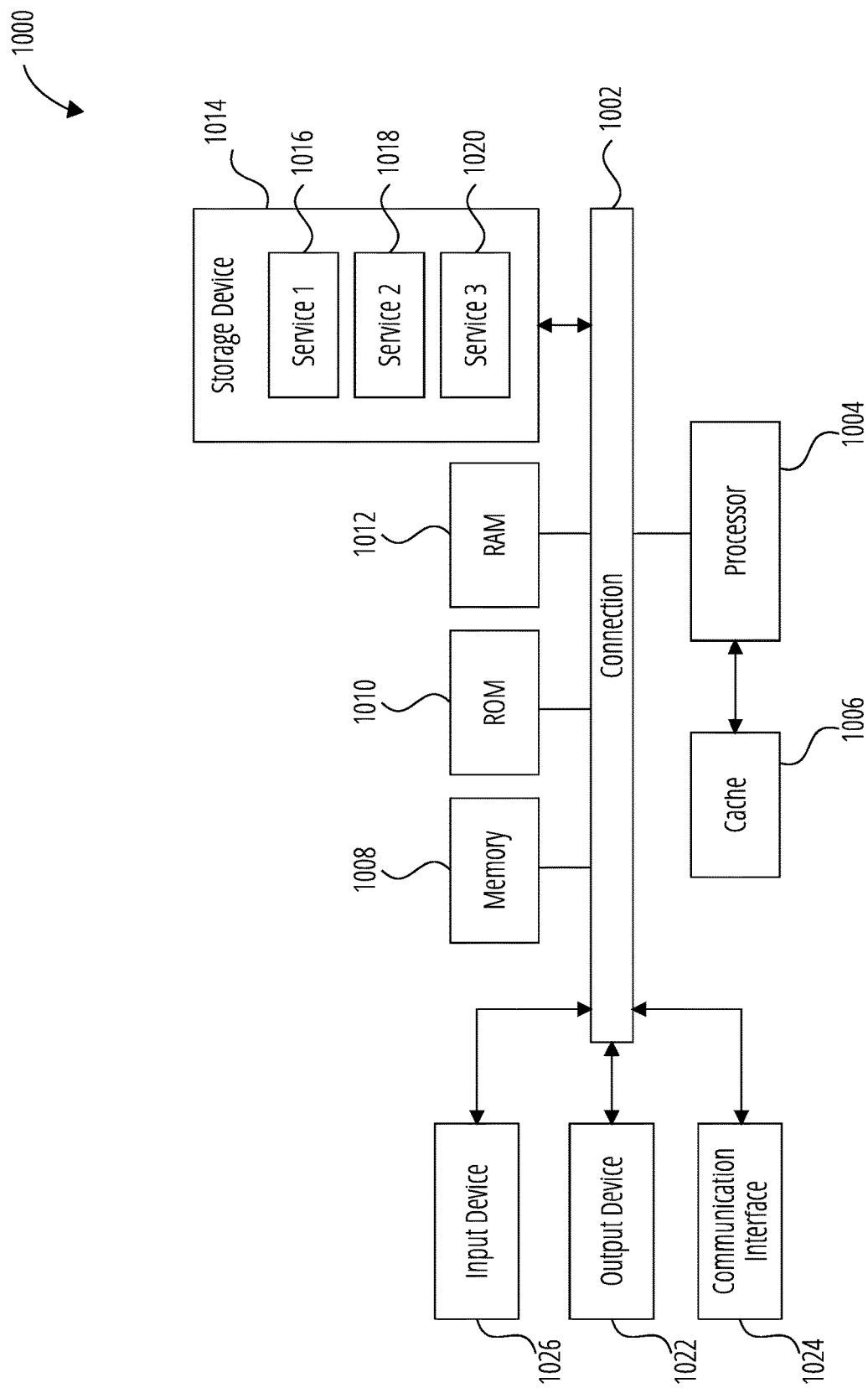
FIG. 10 shows an example of a computing system making up the AI-RRM network according to some aspects of the present technology.

FIG. 10 shows an example of computing system 1000, which can be for example any computing device making up the AI-RRM network, or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Clause 1. A method comprising: receiving first telemetry from a plurality of wireless access points in a network during a first period; analyzing the first telemetry; determining, based on the analysis of the first telemetry, that at least one wireless access point could support an improved connection to at least one user device being serviced by the plurality of wireless access points in the network through a first potential configuration change; and determining to disregard the first potential configuration change based on the network being in a first busy period, and that the first potential configuration change is not significant enough to warrant making the first potential configuration change during the first busy period, wherein the first period occurs during the first busy period.

Clause 2. The method of clause 1, wherein the network is a first network neighborhood of an enterprise network.

Clause 3. The method of clause 1, wherein the analysis of the first telemetry and the determining to disregard the first potential configuration change is performed by a local RRM controller.

Clause 4. The method of clause 1, further comprising: determining to apply the first potential configuration change when the first potential configuration change is significant enough to warrant making the first potential configuration change during the first busy period.

Clause 5. The method of clause 1, further comprising: receiving second telemetry from the plurality of wireless access points reported during a second period, the second period including data from several busy periods including the first busy period; analyzing the second telemetry; determining first preferred network configurations for the plurality of wireless access points in the network based on the second telemetry; and applying the first preferred network configurations to the plurality of wireless access points in the network during a third period, the third period being during a non-busy period.

Clause 6. The method of clause 5, wherein the third period occurs near a start of the non-busy period.

Clause 7. The method of clause 5, further comprising: receiving third telemetry from the plurality of wireless access points reported during the first busy period, the third telemetry including the first telemetry; analyzing the third telemetry; determining modifications to the first preferred network configurations for the plurality of wireless access points in the network based on the analysis of the third telemetry; and applying the modifications to the first preferred network configurations to the plurality of wireless access points in the network during a fourth period, the fourth period occurring during the non-busy period.

Clause 8. The method of clause 7, wherein the fourth period occurs after the third period, and the fourth period occurs at least a determined amount prior to a start of a next busy period.

Clause 9. The method of clause 1, further comprising: applying a first update to an existing configuration of the plurality of wireless access points in the network based on a first analysis of telemetry received from the plurality of wireless access points received over a period spanning at least two busy periods, wherein the first update is applied a short period after termination of the first busy period and during a non-busy period, wherein the first update to the existing configuration puts the plurality of wireless access points in the network to a first preferred network configuration, whereby the network is configured for general operation; applying a second update that modifies the first preferred network configuration based on a second analysis of telemetry received during the first busy period, wherein the second update is applied during the non-busy period after the first update, whereby the first preferred network configuration is tweaked to prepare for a next busy period based on telemetry from the first busy period, wherein the second update results in a tweaked network configuration; and applying a maintenance update to the tweaked network configuration based on telemetry received during the next busy period, wherein the maintenance update is applied during the next busy period when the maintenance update is significant enough to warrant making the change during the next busy period.

Clause 10. A system comprising: a storage configured to store instructions; a processor configured to execute the instructions and cause the processor to: receive first telemetry from a plurality of wireless access points in a network during a first period; analyze the first telemetry; determine, based on the analysis of the first telemetry, that at least one wireless access point could support an improved connection to at least one user device being serviced by the plurality of wireless access points in the network through a first potential configuration change; and determine to disregard the first potential configuration change based on the network being in a first busy period, and that the first potential configuration change is not significant enough to warrant making the first potential configuration change during the first busy period, wherein the first period occurs during the first busy period.

Clause 11. The system of clause 10, wherein the network is a first network neighborhood of an enterprise network.

Clause 12. The system of clause 10, wherein the analysis of the first telemetry and the determining to disregard the first potential configuration change is performed by a local RRM controller.

Clause 13. The system of clause 10, wherein the processor is configured to execute the instructions and cause the processor to: determine to apply the first potential configuration change when the first potential configuration change is significant enough to warrant making the first potential configuration change during the first busy period.

Clause 14. The system of clause 10, wherein the processor is configured to execute the instructions and cause the processor to: receive second telemetry from the plurality of wireless access points reported during a second period, the second period including data from several busy periods including the first busy period; analyze the second telemetry; determine first preferred network configurations for the plurality of wireless access points in the network based on the second telemetry; and apply the first preferred network configurations to the plurality of wireless access points in the network during a third period, the third period being during a non-busy period.

Clause 15. The system of clause 14, wherein the third period occurs near a start of the non-busy period.

Clause 16. The system of clause 14, wherein the processor is configured to execute the instructions and cause the processor to: receive third telemetry from the plurality of wireless access points reported during the first busy period, the third telemetry including the first telemetry; analyzing the third telemetry; determine modifications to the first preferred network configurations for the plurality of wireless access points in the network based on the analysis of the third telemetry; and apply the modifications to the first preferred network configurations to the plurality of wireless access points in the network during a fourth period, the fourth period occurring during the non-busy period.

Clause 17. The system of clause 16, wherein the fourth period occurs after the third period, and the fourth period occurs at least a determined amount prior to a start of a next busy period.

Clause 18. The system of clause 10, wherein the processor is configured to execute the instructions and cause the processor to: apply a first update to an existing configuration of the plurality of wireless access points in the network based on a first analysis of telemetry received from the plurality of wireless access points received over a period spanning at least two busy periods, wherein the first update is applied a short period after termination of the first busy period and during a non-busy period, wherein the first update to the existing configuration puts the plurality of wireless access points in the network to a first preferred network configuration, whereby the network is configured for general operation; apply a second update that modifies the first preferred network configuration based on a second analysis of telemetry received during the first busy period, wherein the second update is applied during the non-busy period after the first update, whereby the first preferred network configuration is tweaked to prepare for a next busy period based on telemetry from the first busy period, wherein the second update results in a tweaked network configuration; and apply a maintenance update to the tweaked network configuration based on telemetry received during the next busy period, wherein the maintenance update is applied during the next busy period when the maintenance update is significant enough to warrant making the change during the next busy period.

Clause 19. A non-transitory computer readable medium comprising instructions, the instructions, when executed by a computing system, cause the computing system to: receive first telemetry from a plurality of wireless access points in a network during a first period; analyze the first telemetry; determine, based on the analysis of the first telemetry, that at least one wireless access point could support an improved connection to at least one user device being serviced by the plurality of wireless access points in the network through a first potential configuration change; and determine to disregard the first potential configuration change based on the network being in a first busy period, and that the first potential configuration change is not significant enough to warrant making the first potential configuration change during the first busy period, wherein the first period occurs during the first busy period.

Clause 20. The computer readable medium of clause 19, wherein the computer readable medium further comprises instructions that, when executed by the computing system, cause the computing system to: apply a first update to an existing configuration of the plurality of wireless access points in the network based on a first analysis of telemetry received from the plurality of wireless access points received over a period spanning at least two busy periods, wherein the first update is applied a short period after termination of the first busy period and during a non-busy period, wherein the first update to the existing configuration puts the plurality of wireless access points in the network to a first preferred network configuration, whereby the network is configured for general operation; apply a second update that modifies the first preferred network configuration based on a second analysis of telemetry received during the first busy period, wherein the second update is applied during the non-busy period after the first update, whereby the first preferred network configuration is tweaked to prepare for a next busy period based on telemetry from the first busy period, wherein the second update results in a tweaked network configuration; and apply a maintenance update to the tweaked network configuration based on telemetry received during the next busy period, wherein the maintenance update is applied during the next busy period when the maintenance update is significant enough to warrant making the change during the next busy period.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving first telemetry from a plurality of wireless access points in a network during a first period;
    analyzing the first telemetry;
    determining, based on the analysis of the first telemetry, that at least one wireless access point supports an improved connection to at least one user device being serviced by the plurality of wireless access points in the network through a configuration change of the at least one wireless access point; and
    determining to disregard the configuration change based on the network being in a busy period, and that a severity of an issue addressed by the configuration change does not outweigh a negative impact of deploying the configuration change during the busy period, wherein the first period occurs during the busy period.

2. The method of claim 1, wherein the network is a first network neighborhood of an enterprise network.

3. The method of claim 1, wherein the analysis of the first telemetry and the determining to disregard the configuration change is performed by a local Radio Resource Management (RRM) controller.

4. The method of claim 1, further comprising:
    determining to apply the configuration change when the severity of the issue addressed by the configuration change outweighs the negative impact of deploying the configuration change during the busy period.

5. The method of claim 1, further comprising:
    receiving second telemetry from the plurality of wireless access points reported during a second period, the second period including data from several busy periods including the busy period;
    analyzing the second telemetry;
    determining first preferred network configurations for the plurality of wireless access points in the network based on the second telemetry; and
    applying the first preferred network configurations to the plurality of wireless access points in the network during a third period, the third period being during a non-busy period.

6. The method of claim 5, wherein the third period occurs after the busy period.

7. The method of claim 5, further comprising:
    receiving third telemetry from the plurality of wireless access points reported during the busy period, the third telemetry including the first telemetry;
    analyzing the third telemetry;
    determining modifications to the first preferred network configurations for the plurality of wireless access points in the network based on the analysis of the third telemetry; and
    applying the modifications to the first preferred network configurations to the plurality of wireless access points in the network during a fourth period, the fourth period occurring during the non-busy period.

8. The method of claim 7, wherein the fourth period occurs after the third period, and the fourth period occurs at least a determined amount prior to a start of a next busy period.

9. The method of claim 1, further comprising:
applying a first update to an existing configuration of the plurality of wireless access points in the network based on a first analysis of telemetry received from the plurality of wireless access points received over a period spanning at least two busy periods, wherein the first update is applied a short period after termination of the busy period and during a non-busy period, wherein the first update to the existing configuration puts the plurality of wireless access points in the network to a first preferred network configuration, whereby the network is configured for general operation;
applying a second update that modifies the first preferred network configuration based on a second analysis of telemetry received during the busy period, wherein the second update is applied during the non-busy period after the first update, whereby the first preferred network configuration is tweaked to prepare for a next busy period based on telemetry from the busy period, wherein the second update results in a tweaked network configuration; and
applying a maintenance update to the tweaked network configuration based on telemetry received during the next busy period, wherein the maintenance update is applied during the next busy period when a severity of an issue addressed within the maintenance update outweighs a negative impact of applying the maintenance update during the next busy period.

10. A system comprising:
a storage configured to store instructions;
a processor configured to execute the instructions and cause the processor to:
receive first telemetry from a plurality of wireless access points in a network during a first period;
analyze the first telemetry;
determine, based on the analysis of the first telemetry, that at least one wireless access point supports an improved connection to at least one user device being serviced by the plurality of wireless access points in the network through a configuration change of the at least one wireless access; and
determine to disregard the configuration change based on the network being in a busy period, and that a severity of an issue addressed by the configuration change does not outweigh a negative impact of deploying the configuration change during the busy period, wherein the first period occurs during the busy period.

11. The system of claim 10, wherein the network is a first network neighborhood of an enterprise network.

12. The system of claim 10, wherein the analysis of the first telemetry and the determining to disregard the configuration change is performed by a local Radio Resource Management (RRM) controller.

13. The system of claim 10, wherein the processor is configured to execute the instructions and cause the processor to:
determine to apply the configuration change when the severity of the issue addressed by the configuration change outweighs the negative impact of deploying the configuration change during the busy period.

14. The system of claim 10, wherein the processor is configured to execute the instructions and cause the processor to:
receive second telemetry from the plurality of wireless access points reported during a second period, the second period including data from several busy periods including the busy period;
analyze the second telemetry;
determine first preferred network configurations for the plurality of wireless access points in the network based on the second telemetry; and
apply the first preferred network configurations to the plurality of wireless access points in the network during a third period, the third period being during a non-busy period.

15. The system of claim 14, wherein the third period occurs after the busy period.

16. The system of claim 14, wherein the processor is configured to execute the instructions and cause the processor to:
receive third telemetry from the plurality of wireless access points reported during the busy period, the third telemetry including the first telemetry;
analyzing the third telemetry;
determine modifications to the first preferred network configurations for the plurality of wireless access points in the network based on the analysis of the third telemetry; and
apply the modifications to the first preferred network configurations to the plurality of wireless access points in the network during a fourth period, the fourth period occurring during the non-busy period.

17. The system of claim 16, wherein the fourth period occurs after the third period, and the fourth period occurs at least a determined amount prior to a start of a next busy period.

18. The system of claim 10, wherein the processor is configured to execute the instructions and cause the processor to:
apply a first update to an existing configuration of the plurality of wireless access points in the network based on a first analysis of telemetry received from the plurality of wireless access points received over a period spanning at least two busy periods, wherein the first update is applied a short period after termination of the busy period and during a non-busy period, wherein the first update to the existing configuration puts the plurality of wireless access points in the network to a first preferred network configuration, whereby the network is configured for general operation;
apply a second update that modifies the first preferred network configuration based on a second analysis of telemetry received during the busy period, wherein the second update is applied during the non-busy period after the first update, whereby the first preferred network configuration is tweaked to prepare for a next busy period based on telemetry from the busy period, wherein the second update results in a tweaked network configuration; and
apply a maintenance update to the tweaked network configuration based on telemetry received during the next busy period, wherein the maintenance update is applied during the next busy period when a severity of an issue addressed within the maintenance update outweighs a negative impact of applying the maintenance update during the next busy period.

19. A non-transitory computer readable medium comprising instructions, the instructions, when executed by a computing system, cause the computing system to:
- receive first telemetry from a plurality of wireless access points in a network during a first period;
- analyze the first telemetry;
- determine, based on the analysis of the first telemetry, that at least one wireless access point supports an improved connection to at least one user device being serviced by the plurality of wireless access points in the network through a configuration change of the at least one wireless access; and
- determine to disregard the configuration change based on the network being in a busy period, and that a severity of an issue addressed by the configuration change does not outweigh a negative impact of deploying the configuration change during the busy period, wherein the first period occurs during the busy period.

20. The computer readable medium of claim 19, wherein the computer readable medium further comprises instructions that, when executed by the computing system, cause the computing system to:
- apply a first update to an existing configuration of the plurality of wireless access points in the network based on a first analysis of telemetry received from the plurality of wireless access points received over a period spanning at least two busy periods, wherein the first update is applied a short period after termination of the busy period and during a non-busy period, wherein the first update to the existing configuration puts the plurality of wireless access points in the network to a first preferred network configuration, whereby the network is configured for general operation;
- apply a second update that modifies the first preferred network configuration based on a second analysis of telemetry received during the busy period, wherein the second update is applied during the non-busy period after the first update, whereby the first preferred network configuration is tweaked to prepare for a next busy period based on telemetry from the first busy period, wherein the second update results in a tweaked network configuration; and
- apply a maintenance update to the tweaked network configuration based on telemetry received during the next busy period, wherein the maintenance update is applied during the next busy period when a severity of an issue addressed within the maintenance update outweighs a negative impact of applying the maintenance update during the next busy period.

* * * * *